United States Patent
Ridinger et al.

(10) Patent No.: US 12,446,141 B2
(45) Date of Patent: Oct. 14, 2025

(54) CONTAMINATION SHIELD FOR MECHANICALLY INSULATING DEVICE

(71) Applicant: ASML Netherlands B.V., Veldhoven (NL)

(72) Inventors: Armin Bernhard Ridinger, San Diego, CA (US); Kyle John Scaffidi, San Diego, CA (US); Nicolas John Ledesma, Escondido, CA (US); Thomas Halloran, San Diego, CA (US)

(73) Assignee: ASML Netherlands B.V., Veldhoven (NL)

( * ) Notice: Subject to any disclaimer, the term of this patent is extended or adjusted under 35 U.S.C. 154(b) by 446 days.

(21) Appl. No.: 17/920,620

(22) PCT Filed: Apr. 8, 2021

(86) PCT No.: PCT/EP2021/059167
§ 371 (c)(1),
(2) Date: Oct. 21, 2022

(87) PCT Pub. No.: WO2021/223953
PCT Pub. Date: Nov. 11, 2021

(65) Prior Publication Data
US 2023/0156898 A1    May 18, 2023

Related U.S. Application Data

(60) Provisional application No. 63/020,760, filed on May 6, 2020.

(51) Int. Cl.
*H05G 2/00* (2006.01)
*F16L 51/02* (2006.01)
*F16L 59/08* (2006.01)

(52) U.S. Cl.
CPC .......... *H05G 2/0094* (2024.08); *F16L 51/026* (2013.01); *F16L 59/08* (2013.01)

(58) Field of Classification Search
CPC ........ H05G 2/00; H05G 2/005; H05G 2/0092; F16L 51/026; F16L 59/08
See application file for complete search history.

(56) References Cited

U.S. PATENT DOCUMENTS

| 4,776,617 A | 10/1988 | Sato |
| 5,373,920 A | 12/1994 | Valdivia et al. |

(Continued)

FOREIGN PATENT DOCUMENTS

| JP | S51-133817 U | 10/1976 |
| JP | S52-22212 U | 2/1977 |

(Continued)

OTHER PUBLICATIONS

Jan Krauss, European International Searching Authority, International Search Report and Written Opinion, counterpart PCT Application No. PCT/EP2021/059167, mailed Sep. 6, 2021, 18 pages.

*Primary Examiner* — David E Smith
(74) *Attorney, Agent, or Firm* — DiBerardino McGovern IP Group LLC

(57) ABSTRACT

An apparatus includes: a mechanically insulating device including a flexible bellows (315) extending between first and second flanges (325, 330) and defining a bellows passageway that extends along an axial direction between openings of the first and second flanges; a rigid inner sleeve (335) affixed to or supported by the first flange and extending along the bellows passageway in the axial direction; and a shield device (340 including i.a. 342, 344). The rigid inner sleeve has an outer diameter that is less than an inner diameter of the flexible bellows. The shield device is at least partly fixed to or supported by the second flange and defines an axial device opening having a diameter that is less than (Continued)

the inner diameter of the flexible bellows and is greater than the outer diameter of the rigid inner sleeve. The shield device is configured to block particulates from entering a region between the flexible bellows and the rigid inner sleeve.

31 Claims, 20 Drawing Sheets

(56) References Cited

U.S. PATENT DOCUMENTS

2017/0131129 A1* 5/2017 Ahr ................... H05G 2/006
2018/0283588 A1* 10/2018 Gray .................. F16L 11/083

FOREIGN PATENT DOCUMENTS

| | | | | |
|---|---|---|---|---|
| JP | 59-121594 U | * | 8/1984 | |
| JP | S59121594 U | * | 8/1984 | |
| JP | H11-6589 A | | 1/1999 | |
| JP | 2006083759 A | | 3/2006 | |
| TW | 200523999 A | | 7/2005 | |
| WO | WO-9720165 A1 | * | 6/1997 | ............ F16L 51/026 |
| WO | WO-2018062146 A1 | * | 4/2018 | ............ C23C 22/68 |

\* cited by examiner

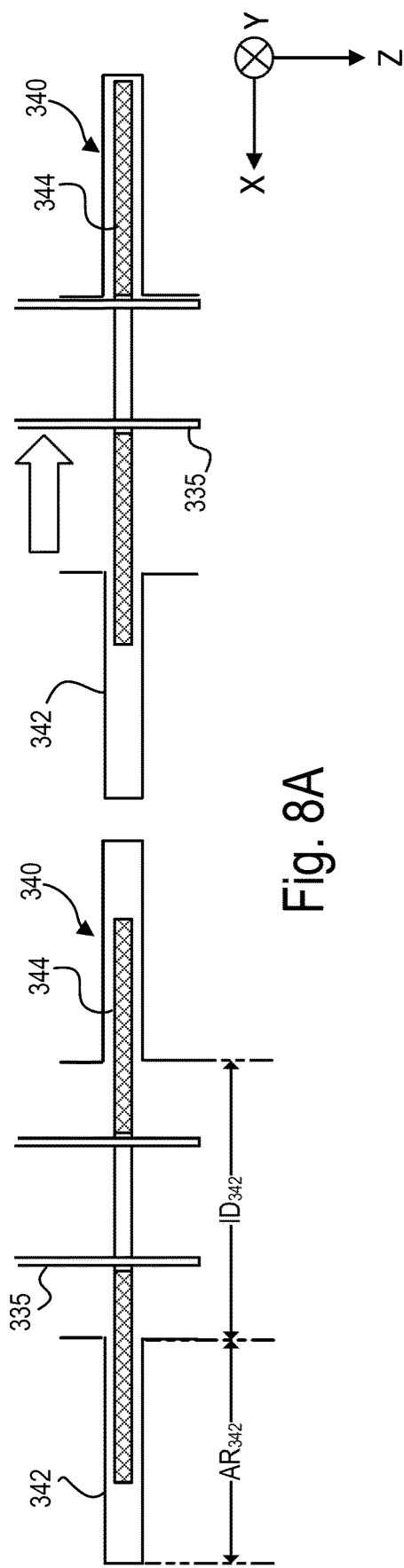
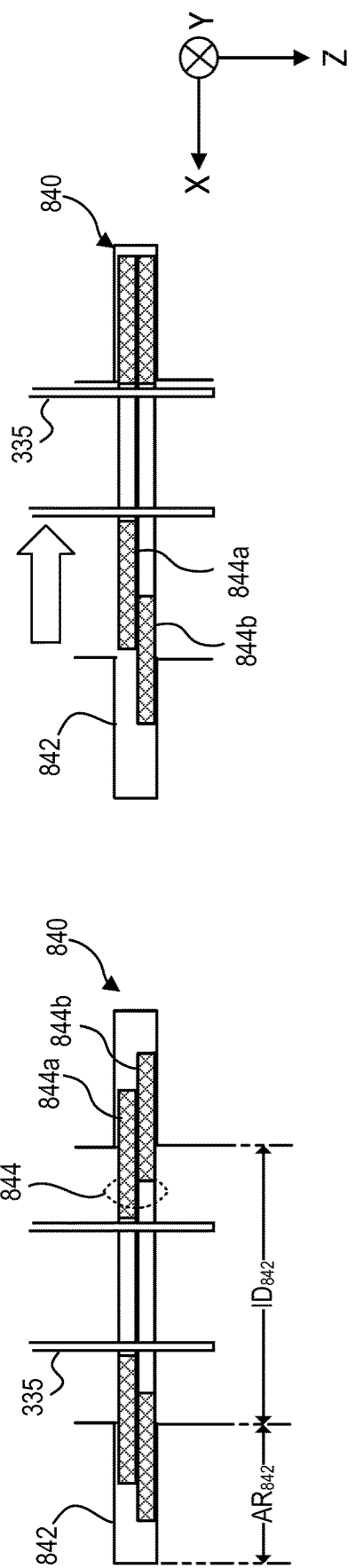
Fig. 8A
Fig. 8B

CONTAMINATION SHIELD FOR MECHANICALLY INSULATING DEVICE

CROSS REFERENCE TO RELATED APPLICATIONS

This application claims priority to U.S. Application No. 63/020,760, filed May 6, 2020 and titled CONTAMINATION SHIELD FOR MECHANICAL INSULATING DEVICE and which is incorporated herein in its entirety by reference.

TECHNICAL FIELD

The disclosed subject matter relates to an apparatus for shielding a mechanically insulating device such as a flexible bellows from unwanted materials.

BACKGROUND

A fluid material (such as a liquid, a gas, or a partial liquid) that moves in a system can collide with a surface (an impact surface) in the system. The collision with the impact surface can result in splashing, deposition, and/or scattering of the material, and the splashing, deposition, and/or scattering can result in contamination of the impact surface and objects near the impact surface. The contamination can be, for example, bits of material that are flung from the material as a result of the collision. The contamination of the object can result in the performance of the object and/or the entire system being degraded.

For example, the system can include an optical element such as a mirror, and contamination of the mirror can change the reflective properties of the mirror. The mirror can be a mirror in an extreme ultraviolet (EUV) light source, and the contamination can result in reduced amounts of EUV light being output by the EUV light source.

EUV light, for example, electromagnetic radiation having wavelengths of 100 nanometers (nm) or less (also sometimes referred to as soft x-rays), and including light at a wavelength of, for example, 20 nm or less, between 5 and 20 nm, or between 13 and 14 nm, can be used in photolithography processes to produce extremely small features in substrates, for example, silicon wafers, by initiating polymerization in a resist layer. Methods to produce EUV light include, but are not necessarily limited to, converting a material that includes an element, for example, xenon, lithium, or tin, with an emission line in the EUV range in a plasma state. In one such method, often termed laser produced plasma ("LPP"), the required plasma is produced by irradiating a target material, for example, in the form of a droplet, plate, tape, stream, or cluster of material, with an amplified light beam. For this process, the plasma is typically produced in a sealed vessel, for example, a vacuum chamber, and monitored using various types of metrology equipment.

During operation, an EUV light source utilizes and produces gasses, liquids, and partial liquids (such as the plasma effluent) that are delivered between components and pass through various mechanical connective devices that provide conduits for the fluid flow between the components.

SUMMARY

In some general aspects, an apparatus includes: a mechanically insulating device having a flexible bellows extending between first and second flanges; a rigid inner sleeve; and a shield device. The flexible bellows defines a bellows passageway that extends along an axial direction between openings of the first and second flanges. The rigid inner sleeve is affixed to or supported by the first flange and extends along the bellows passageway in the axial direction. The rigid inner sleeve has an outer diameter that is less than an inner diameter of the flexible bellows. The shield device is at least partly fixed to or supported by the second flange and defines an axial device opening having a diameter that is less than the inner diameter of the flexible bellows and is greater than the outer diameter of the rigid inner sleeve. The shield device is configured to enable relative motion between the first and second flanges, the relative motion including translational motion along one or more directions that are perpendicular to the axial direction and rotational motion about one or more directions that are perpendicular to the axial direction.

Implementations can include one or more of the following features. For example, the shield device can extend into the bellows passageway.

A distance between an inner diameter of the flexible bellows and the outer diameter of the rigid inner sleeve can be greater than about 10%, greater than about 20%, or greater than about 30% of the inner diameter of the flexible bellows.

The shield device can include one or more disks that extend along a direction that is not parallel to the axial direction. The direction in which the one or more disks extend can be perpendicular to the axial direction. The one or more disks can include a plurality of disks. An outer diameter of at least one disk can be different from the outer diameter of each other disk, and an inner diameter of at least one disk can be different from the inner diameter of each other disk. An outer diameter of at least one disk can be equal to the outer diameter of another disk, and an inner diameter of at least one disk can be equal to the inner diameter of another disk. Each disk can be constrained from moving along the axial direction and can be free to move along a direction not parallel to the axial direction. Each disk can be defined by a thickness along the axial direction that allows each disk to be installed adjacent to the second flange. Each of the one or more disks can include a slit that extends from an outer diameter of the disk to an inner diameter of the disk, the slit allowing each disk to be installed adjacent to the second flange. The shield device can also include a disk housing configured to retain the one or more disks. The disk housing can be defined by an inner diameter that is equal to the inner diameter of the flexible bellows. At least one disk of the one or more disks can have an outer diameter that is greater than an inner diameter of the disk housing. The one or more disks can include a plurality of disks. If any one of the disks is a small disk that has an outer diameter that is less than a sum of an inner diameter of the disk housing plus an annular radius of the disk housing, then the small disk can be sandwiched between two disks each having outer diameters that are greater than the sum of the inner diameter of the disk housing plus the annular radius of the disk housing.

Each disk can be defined by a thickness along the axial direction such that the one or more disks are receivable within the disk housing.

The shield device can be configured to at least partially cover or mostly cover a region between the flexible bellows and the rigid inner sleeve so that the shield device block particulates from entering this region. The particulates can include one or more of solid particles, fluid particles, and splashes.

The flexible bellows can include pleats configured to fold and unfold to enable the relative motion between the first and second flanges.

The shield device can be made of a metal that includes a coating configured to prevent particulates from contaminating the shield device. The particulates can include one or more of solid particles, fluid particles, and splashes. And, the shield device coating can be configured to: repel fluid particles to thereby prevent the fluid particles from accumulating on the shield device; and prevent solid particles solidified on the shield device from sticking to the shield device. The shield device coating can be further configured to prevent corrosion of an exterior surface of the shield device, such corrosion being caused by contamination by the particulates. The metal can be stainless steel and the shield device coating can be a metal nitride or a metal oxide.

The rigid inner sleeve can be made of a metal. The metal can have a high thermal conductivity. The rigid inner sleeve can be made of molybdenum, aluminum, copper, aluminum oxide, diamond, or graphite. The rigid inner sleeve can include a coating configured to prevent particulates from contaminating one or more of the shield device and the rigid inner sleeve. The particulates can include one or more of: solid particles, fluid particles, and splashes. The rigid inner sleeve coating can be configured to: repel the fluid particles to thereby prevent the fluid particles from accumulating on the shield device; and prevent solid particles solidified on the shield device from sticking to the shield device. The rigid inner sleeve coating can be configured to repel fluid particles along a direction that is parallel with the axial direction or away from the shield device such that when a fluid propagates through the rigid inner sleeve such fluid detaches from the rigid inner sleeve having a propagation direction that is parallel with the axial direction or away from the shield device. The rigid inner sleeve coating can be further configured to prevent corrosion of an exterior surface of the shield device, such corrosion caused by contamination of the particulates. The rigid inner sleeve coating can be a metal nitride, a metal oxide, or a silicon nitride.

The apparatus can also include a heating apparatus configured to adjust a temperature of the rigid inner sleeve. The heating apparatus can be in direct thermal communication with an outer surface of the rigid inner sleeve to adjust the temperature of the rigid inner sleeve by thermal conduction. The heating apparatus can be arranged to not be in direct thermal communication with the flexible bellows.

The first and second flanges can be vacuum flanges.

The apparatus can also include an inner guard extending over an opening of one or more of: the first flange and the second flange. The inner guard can be made of a metal that includes a guard coating configured to prevent particulates from contaminating the inner guard. The distance between the inner guard and the respective flange can be small enough to reduce an amount of particulates from contaminating the respective flange. The distance between the inner guard and the respective flange can be configured to reduce the amount of particulates from contaminating the respective flange at least in part because particles are repelled from the surfaces of the inner guard and the respective flange. The particulates can include one or more of solid particles, fluid particles, and splashes. The coating can be configured to: repel the fluid particles to prevent the fluid particles from accumulating on the inner guard; and prevent the solid particles from sticking to the inner guard. The guard coating can be a metal nitride.

The rigid inner sleeve and the shield device can be arranged so that the rigid inner sleeve is configured to penetrate the opening of the shield device.

The flexible bellows can be coupled or fixed at a first end to the first flange and at a second end to the second flange. The rigid inner sleeve can be either affixed directly to the first flange or affixed to a first end of the flexible bellows that is fixed to the first flange.

In other general aspects, an extreme ultraviolet (EUV) light source includes: a chamber comprising a chamber wall defining a fluid portal; and an apparatus retained at the chamber wall. The apparatus includes: a mechanically insulating device including a flexible bellows extending between first and second flanges; a rigid inner sleeve; and a shield device. The flexible bellows defines a bellows passageway that extends along an axial direction between openings of the first and second flanges, such openings being in fluid communication with the fluid portal. The rigid inner sleeve is affixed to or supported by the first flange and extends along the bellows passageway in the axial direction. The inner sleeve has an outer diameter that is less than an inner diameter of the flexible bellows. The shield device is at least partly fixed to or supported by the second flange and defines an axial device opening having a diameter that is less than the inner diameter of the flexible bellows and is greater than the outer diameter of the rigid inner sleeve. The shield device is configured to enable relative motion between the first and second flanges caused by movement of the chamber wall, the relative motion including translational motion along one or more directions that are perpendicular to the axial direction and rotational motion about one or more directions that are perpendicular to the axial direction.

Implementations can include one or more of the following features. For example, the first flange can be fixed to the chamber wall and the second flange can be fixed to a second wall of a second chamber. The EUV light source can further include a target material supply system including a droplet generator configured to produce a stream of targets. The targets include a target material that emits EUV light when in a plasma state. The EUV light source can also include a structure defining a structure passageway configured to receive target material that travels along a target material path. The first flange can be fixed to a wall of the structure. The second flange can be fixed to a wall of a receptacle configured to receive target material from the structure passageway. The first and second flanges can be vacuum flanges, the first flange can be fixed to the wall of the structure with a vacuum seal, and the second flange can be fixed to the wall of the receptacle with another vacuum seal. The EUV light source can further include a first inner guard extending over the opening of the first flange, and a second inner guard extending over the opening of the second flange. Each of the first and second inner guards can be configured to: block the target material from contacting the respective vacuum seal; and prevent the target material from solidifying between the respective flange and the structure wall at the location of the vacuum seal to thereby form an unwanted joint between the respective flange and the structure wall. The structure can be arranged at a location of the chamber opposite to the droplet generator. The structure passageway can coincide with a direction of gravity and a flow direction of the target material at least partly coincides with the direction of gravity.

The apparatus can be implemented as a gravity-driven drain configured to pass or trap target material traveling within the chamber.

In other general aspects, an apparatus includes: a mechanically insulating device including a flexible bellows extending between first and second flanges; a rigid inner sleeve; and a shield device. The flexible bellows defines a bellows passageway that extends along an axial direction between openings of the first and second flanges. The rigid inner sleeve is affixed to or supported by the first flange and extends along the bellows passageway in the axial direction. The inner sleeve has an outer diameter that is less than an inner diameter of the flexible bellows. The shield device is at least partly fixed to or supported by the second flange and defines an axial device opening having a diameter that is less than the inner diameter of the flexible bellows and is greater than the outer diameter of the rigid inner sleeve. The shield device is configured to at least partially cover or mostly cover a region between the flexible bellows and the rigid inner sleeve so that the shield device block particulates from entering this region.

Implementations can include one or more of the following features. For example, the shield device can include one or more movable disks supported by a disk housing fixed to the second flange, each disk defining an opening large enough to accommodate the rigid inner sleeve. Each disk can have an inner diameter that is less than the inner diameter of the flexible bellows. The one or more movable disks can be configured to enable relative motion between the first and second flanges, the relative motion including translational motion along one or more directions that are perpendicular to the axial direction and rotational motion about one or more directions that are perpendicular to the axial direction.

In other general aspects, an apparatus includes: a structure including a structure interior configured to receive target material that travels along a path; a receptacle including a volume; and a connection device between the structure and the receptacle, and configured to provide a fluid communication between the structure interior and the receptacle volume. The connection device includes: a mechanically insulating device comprising a flexible bellows extending between first and second flanges; an inner sleeve; and a shield device. The flexible bellows defines a bellows passageway that extends along an axial direction between openings of the first and second flanges. The first flange is fixed to a wall of the structure and the second flange is fixed to the receptacle. The inner sleeve is affixed to or supported by the first flange and extends within the bellows passageway in the axial direction. The inner sleeve has an outer diameter that is less than an inner diameter of the flexible bellows and defines a sleeve passageway within the bellows passageway, such that the sleeve passageway provides the fluid communication between the structure interior and the receptacle volume. The shield device is at least partly fixed to or supported by the second flange and defines an axial device opening having a diameter that is less than the inner diameter of the flexible bellows and is greater than the outer diameter of the rigid inner sleeve.

Implementations can include one or more of the following features. For example, the receptacle can be in fluid communication with a nozzle system of a target supply system configured to supply target material to an EUV light source. The receptacle can be a part of a target material debris collection and drain system of a drain module within a chamber of an EUV light source.

DESCRIPTION OF DRAWINGS

FIG. 8A is a side cross-sectional view of another implementation of the section 3F of the apparatus of FIG. 3D, showing motion of the rigid inner sleeve relative to a shield device that includes a single disk in a disk housing;

FIG. 8B is a side cross-sectional view of another implementation of the section 7C of the apparatus of FIG. 7A, showing motion of the rigid inner sleeve relative to a shield device that includes two disks in a disk housing;

DESCRIPTION

Figure 1:
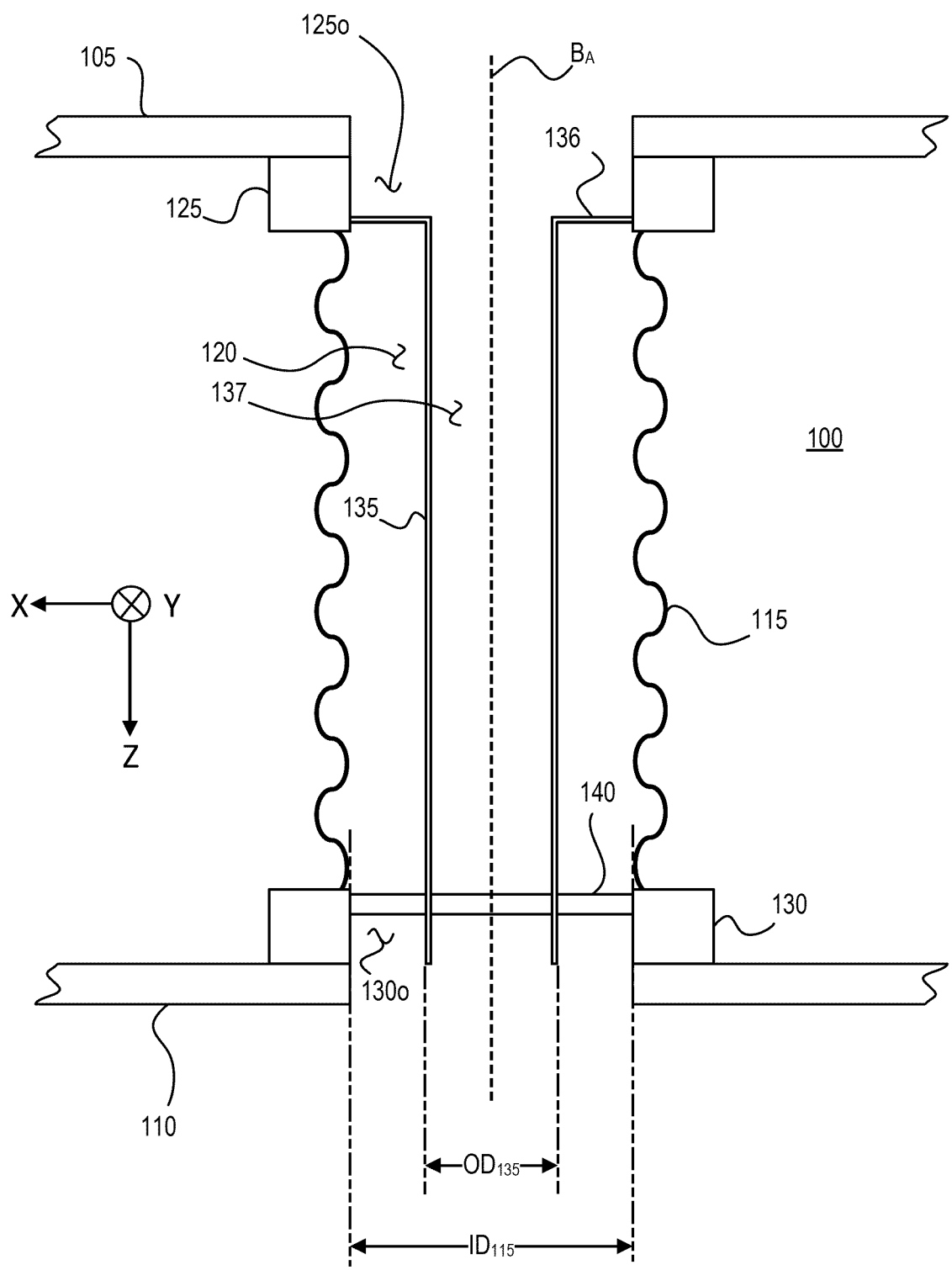
FIG. 1 is a block diagram of an apparatus including a mechanically insulating device, a rigid inner sleeve extending within a passageway of the mechanically insulating device, and a shield device configured to blocks particulates from entering a gap between the rigid inner sleeve and the mechanically insulating device.
Figure 2B:
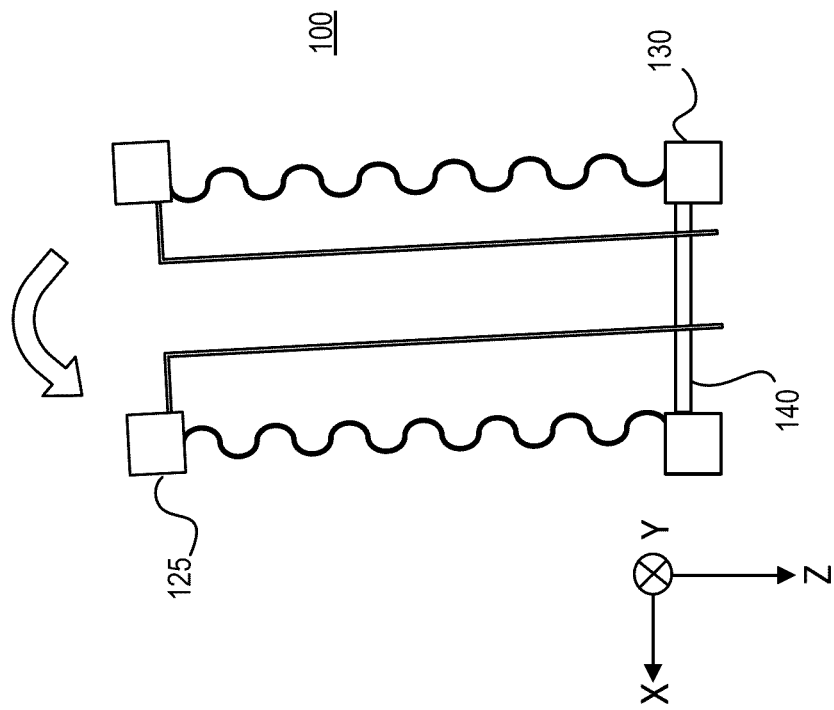
FIGS. 2A and 2B are block diagrams of the apparatus of FIG. 1, showing, respectively, translational and rotational relative motion between a first flange at a first end of the mechanically insulating device and a second flange at a second end of the mechanically insulating device.
Figure 2A:
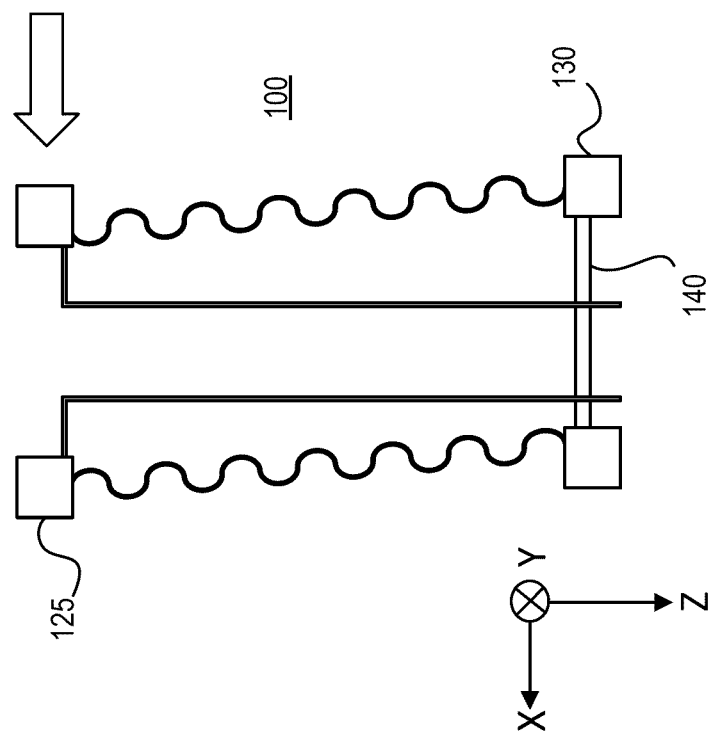

Referring to FIGS. 1, 2A, and 2B, an apparatus 100 is configured as a pass-through fluid device that connects a first part 105 and a second part 110. The apparatus 100 enables relative movement between the first and second parts 105, 110 while maintaining the connection between the first and second parts 105, 110, and while also maintaining a fluid flow path for a fluid to pass between the first and second parts 105, 110. The relative movement between the first and second parts 105, 110 can be due to thermal expansion or contraction of one or more of the first and second parts 105, 110, and vibrations and positional deviations between the first and second parts 105, 110.

The apparatus 100 provides a flexible and mechanically adjustable pathway for the fluid path between the first and second parts 105, 110. The apparatus 100 includes a mechanically insulating device 115 that includes a flexible bellows extending between a first flange 125 defining a first opening 1250 and a second flange 130 defining a second opening 1300. The flexible bellows 115 defines a bellows passageway 120 that extends along an axial direction $B_A$ between the openings 1250, 1300. The axial direction $B_A$ is parallel with a Z axis of an X, Y, Z coordinate system.

The first flange 125 is fixed to the first part 105 and the second flange 130 is fixed to the second part 110 such that fluid is enabled to pass through the openings 1250, 1300. The first and second flanges 125, 130 are extensions (such as a rib or a rim) that provides for strength, and for attachment to between the respective first and second part 105, 110 and the mechanically insulating device 115. Moreover, the first and second flanges 125, 130 can be vacuum flanges that each act to provide a hermetic seal between the respective first and second part 105, 110 and the mechanically insulating device 115, such seal acting to maintain the fluid within the fluid flow path. Thus, in order to achieve a vacuum seal at each vacuum flange 125, 130, a gasket can be arranged at the interface between the respective first and second part 105, 110 and the first and second flange 125, 130. The gasket can be, for example, an elastomeric O-ring placed in a groove.

The apparatus 100 includes a rigid inner sleeve 135 that is fixed to the first flange 125 by a mounting structure 136. The rigid inner sleeve 135 extends along the bellows passageway 120 along the axial direction $B_A$, and defines a sleeve passageway 137 within the bellows passageway 120. An outer diameter $OD_{135}$ of the inner sleeve 135 is less than an inner diameter $ID_{115}$ of the flexible bellows 115. The rigid inner sleeve 135 acts as a shield that prevents or drastically reduces a contamination of the flexible bellows 115. In particular, the rigid inner sleeve 135 physically blocks particulates (that can be in fluid that flows between the first part 105 and the second part 110) from reaching the flexible bellows 115. Specifically, the rigid inner sleeve 135 maintains particulates that travel between the first and second parts 105, 110 within the sleeve passageway 137 (and thus keeping such particulates separated from the flexible bellows 115). The rigid inner sleeve 135 also enables removal of such particulates from the sleeve passageway 137 in a manner that ensures such particulates have a reduced or minimal disruption to operation of the first and second flanges 125, 130 and the flexible bellows 115.

Figure 13:
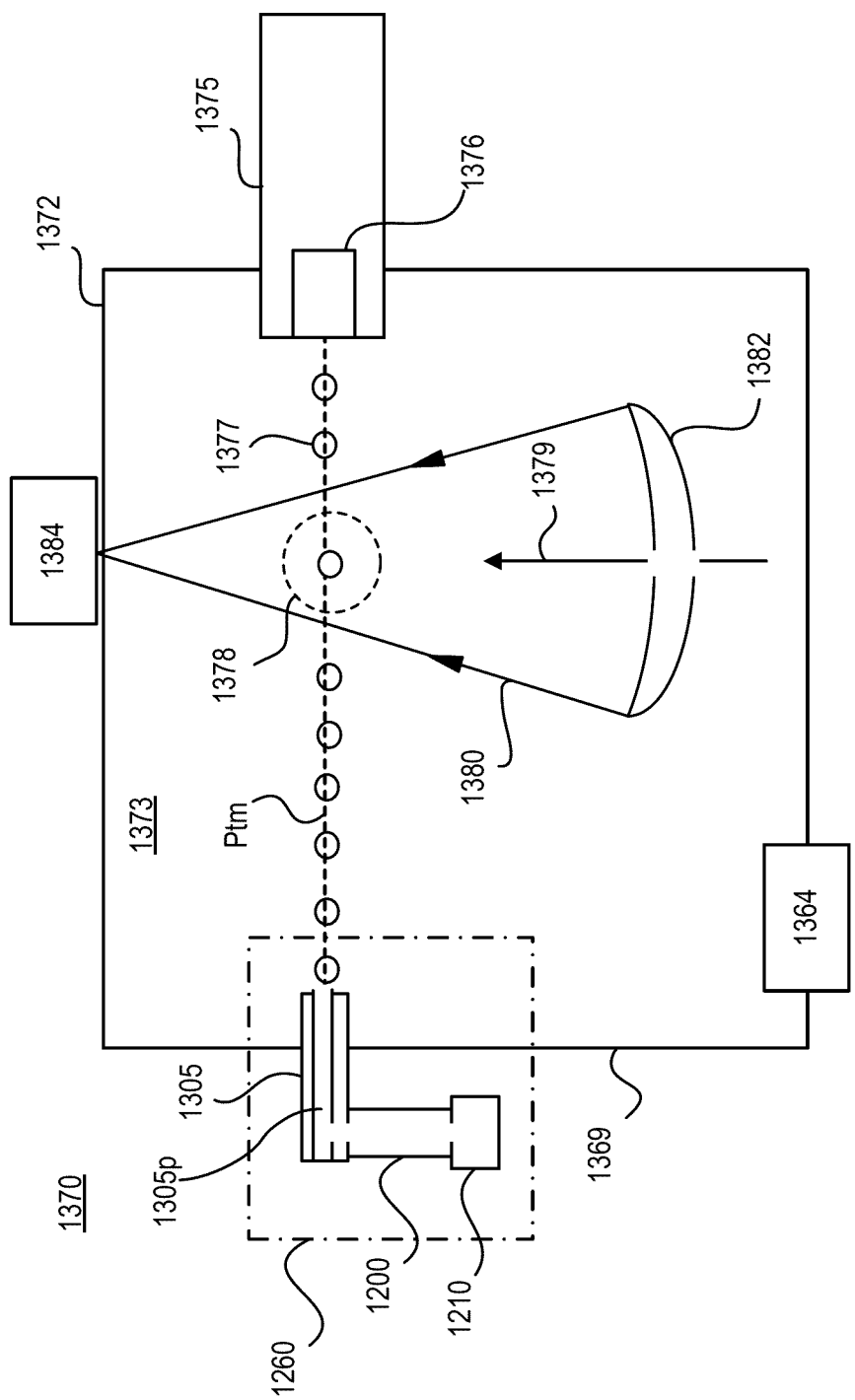
FIG. 13 is a block diagram of an extreme ultraviolet (EUV) light source, in which the receptacle of FIG. 12 is in fluid communication with a nozzle system of a target supply system configured to supply target material.

In some implementations, particulates can be formed within an extreme ultraviolet (EUV) light source chamber from a target material that emits EUV light when in a plasma state (such as shown in FIG. 13). The target material can be, for example, water, tin, lithium, xenon, or any material that, when converted to a plasma state, has an emission line in the EUV range. For example, the target material can be the element tin, which can be used as pure tin (Sn); as a tin compound, for example, SnBr4, SnBr2, SnH4; as a tin alloy, for example, tin-gallium alloys, tin-indium alloys, tin-indium-gallium alloys, or any combination of these alloys.

During operation, and without the use of the rigid inner sleeve 135, the flexible bellows 115 would be exposed to the particulates due to the flow of fluid between the first and second parts 105, 110. Such particulates include, for example, solid particles, fluid particles, and splashes of clusters of particles. Contamination of the flexible bellows 115 and the attached flanges 125, 130 from these particulates can have a detrimental effect on the functionality of the flexible bellows 115; the vacuum integrity of the flexible bellows 115; and the integrity of the vacuum seal or seals at least partly maintained by the flexible bellows 115. In particular, the flexible bellows 115 is made of a flexible and thin bellows material extending along the axial direction $B_A$, and this bellows material has a geometric configuration that includes corrugations or pleats (such as ridges or grooves). These corrugations or pleats are configured to fold and unfold to enable the relative motion between the first and second flanges 125, 130. These corrugations or pleats provide functionality to the flexible bellows 115; for example, the expansion and contraction of the corrugations enables relative movement between the first and second parts 105, 110 while maintaining the connection between the first and second parts 105, 110. Particulates that are deposited within the corrugations of the flexible bellows 115 can therefore compromise the ability of the flexible bellows 115 to expand and/or contract. Moreover, particulates that are deposited on the thin bellows material of the flexible bellows 115 can also corrode the thin bellows material, which therefore compromises the vacuum integrity of the flexible bellows 115. This can lead to a vacuum leak through the thin bellows material of the flexible bellows 115.

As discussed above, the outer diameter $OD_{135}$ of the inner sleeve 135 is less than the inner diameter $ID_{115}$ of the flexible bellows 115. Moreover, the outer diameter $OD_{135}$ of the inner sleeve 135 is small enough so that a gap between the inner sleeve 135 and the flexible bellows 115 is great enough to permit the needed motion of the flexible bellows 115 and to permit the full relative motion between the first and second flanges 125, 130. A difference (G) between the inner diameter $ID_{115}$ of the flexible bellows 115 and the outer diameter $OD_{135}$ of the inner sleeve 135 is given by $G=ID_{115}-OD_{135}$. This difference G can be greater than a percentage P of the inner diameter $ID_{115}$ of the flexible bellows 115. In some implementations, the difference G is greater than about 10% of the inner diameter $ID_{115}$ of the flexible bellows 115, or $G>0.1 \times ID_{115}$. In other implementations, the difference G is greater than about 20% of the inner diameter $ID_{115}$ of the flexible bellows 115, or $G>0.2 \times ID_{115}$. In other implementations, the difference G is greater than about 30% of the inner diameter $ID_{115}$ of the flexible bellows 115, or $G>0.3 \times ID_{115}$.

As shown in FIG. 2A, the relative motion between the first and second flanges 125, 130 can be a translation motion along one or more directions that are perpendicular to the axial direction $B_A$. While translation along the X axis is shown in FIG. 2A, such translation motion can be along any direction in the XY plane. As shown in FIG. 2B, the relative motion between the first and second flanges 125, 130, can be a rotation motion about one or more directions that are perpendicular to the axial direction $B_A$. While rotation about the Y axis is shown in FIG. 2B, such rotational motion can be about any direction in the XY plane.

The apparatus 100 further includes a shield device 140 positioned within the gap between the inner sleeve 135 and the flexible bellows 115. The shield device 140 acts as a shield or cover that blocks particulates (such as solid particles, fluid particles, and splashes or splash particles) from entering the gap between the rigid inner sleeve 135 and the flexible bellows 115. Moreover, the shield device 140 is able to perform the function of preventing contamination while still maintaining the separation between the inner sleeve 135 and the flexible bellows 115 and not restricting motion of the rigid inner sleeve 135.

Figure 3A:
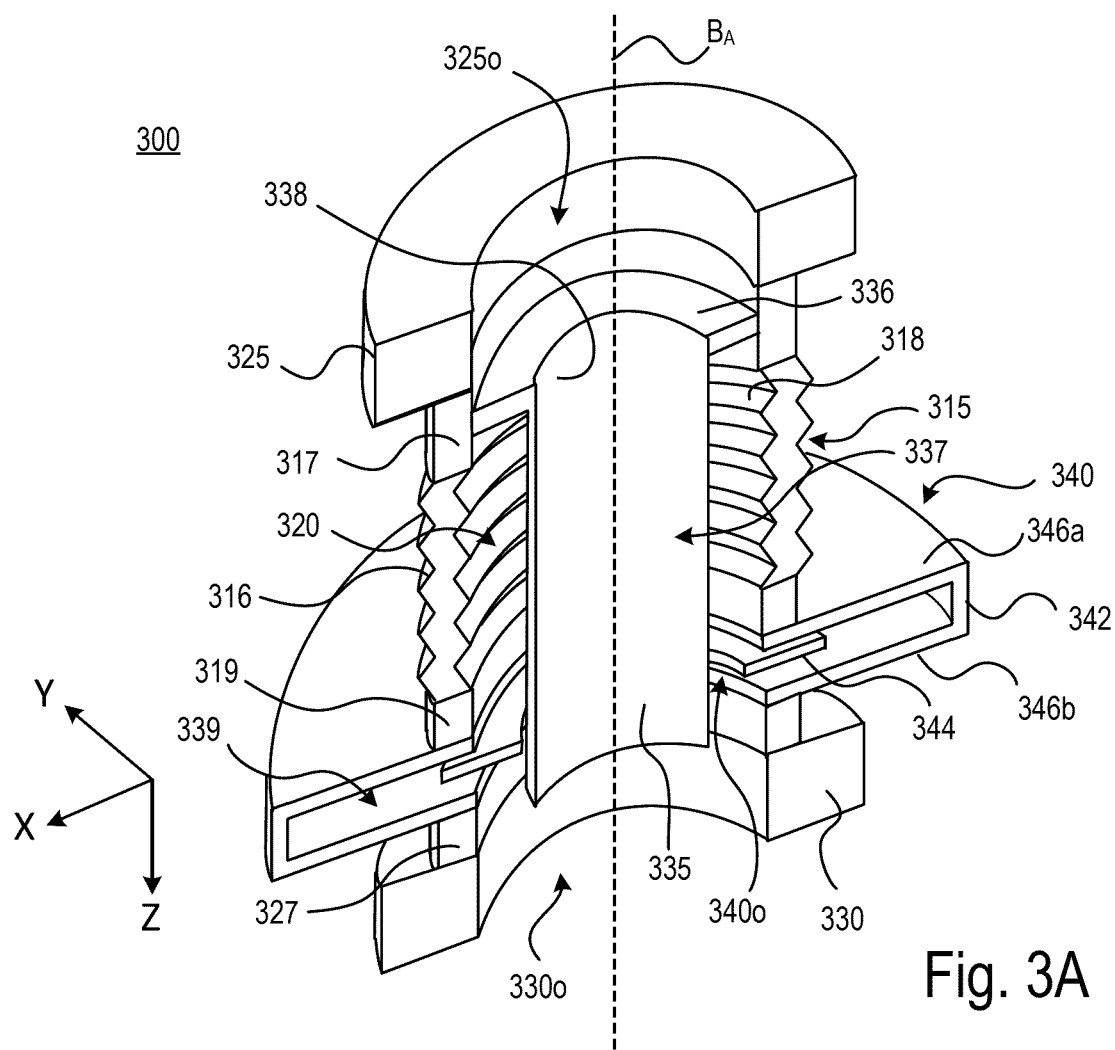
FIG. 3A is a cutaway perspective view of an implementation of the apparatus of FIG. 1.

Referring to FIG. 3A, an implementation 300 of the apparatus 100 is shown. The apparatus 300 includes a flexible bellows 315 extending between a first flange 325 defining a first opening 3250 and a second flange 330 defining a second opening 3300. The first flange 325 can be fixed to a structure or part such as the first part 105 (FIG. 1), and the second flange 330 can be fixed to another structure or part such as the second part 110 (FIG. 1). In this way, a vacuum seal can be formed between the first flange 325 and the first part 105 and a vacuum seal can be formed between the second flange 330 and the second part 110. The flexible bellows 315 is an implementation of the mechanically insulating device 115 (FIG. 1). The apparatus 300 also include a rigid inner sleeve 335 fixed to the first flange 325 and a shield device 340 at least partly fixed or supported by the second flange 330.

The flexible bellows 315 defines a bellows passageway 320 that extends along an axial direction $B_A$ between the first opening 3250 and the second opening 3300. The axial direction $B_A$ is parallel with the Z axis. The flexible bellows 315 includes a first end 317, a second end 319, and a corrugated portion 316 made of a bellows material and geometrically shaped to allow for the functionality of the flexible bellows 315 including expansion and contraction. The first end 317 is fixed to the first flange 325 and connects the corrugated portion 316 of the flexible bellows 315 to the first flange 325. The second end 319 is fixed to the shield device 340 and connects the corrugated portion 316 of the flexible bellows 315 to the shield device 340. The corrugated portion 316 includes pleats 318 that are configured to fold and unfold enabling the flexible bellows 315 to expand and contract generally along the axial direction $B_A$. This functionality of the flexible bellows 315 permits for relative movement between the first and second flanges 325, 330 that can be caused by thermal expansion or contraction of one or more of the structures fixed to each of the flanges 325, 330, and vibrations and positional deviations between the structures fixed to each of the flanges 325, 330. The relative movement is discussed with reference to FIGS. 4A-6B.

Figure 3B:
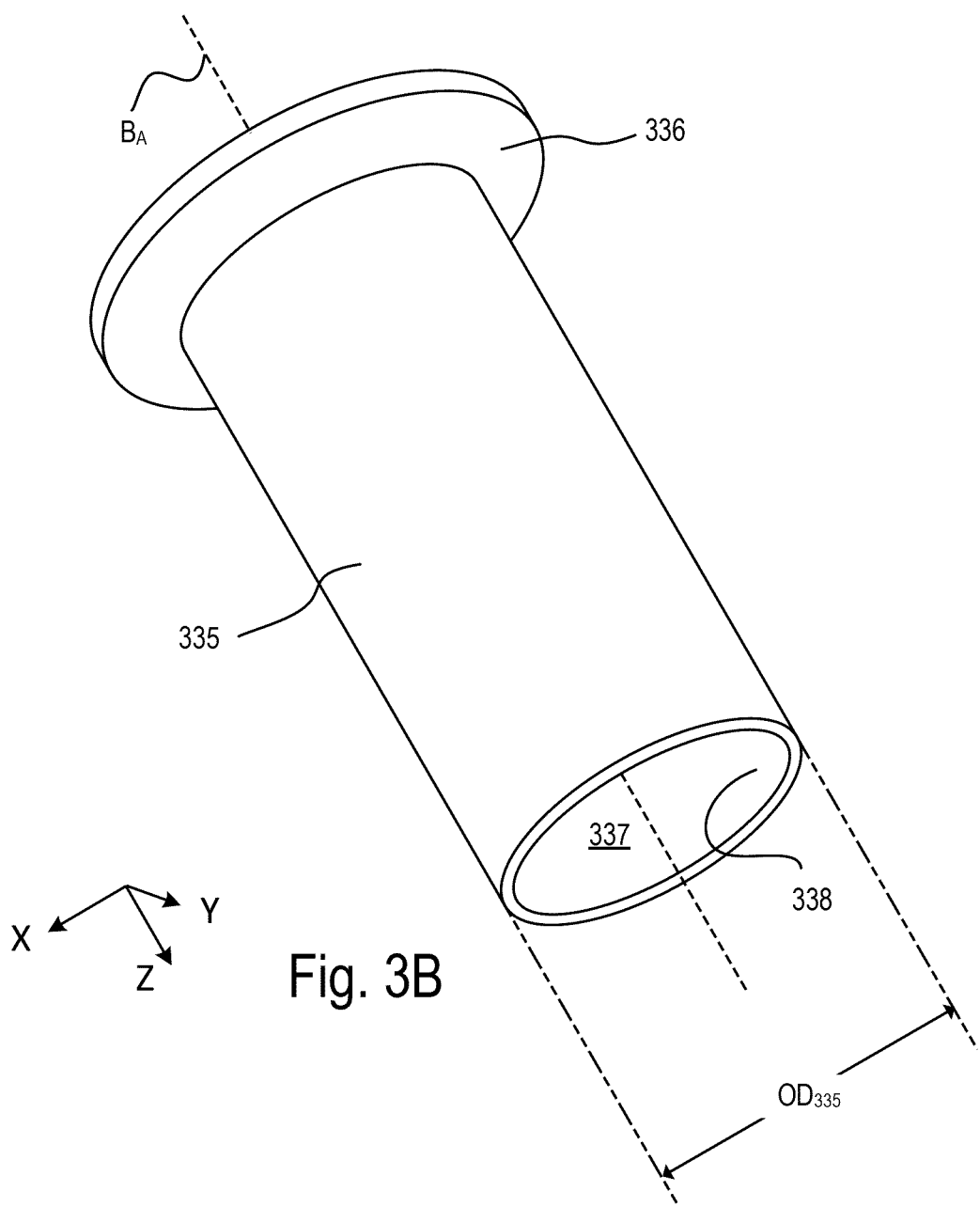
FIG. 3B is a perspective view of a rigid inner sleeve of the apparatus of FIG. 3A.

The rigid inner sleeve 335 extends through the bellows passageway 320 along the axial direction $B_A$. The rigid inner sleeve 335 defines a sleeve passageway 337 within the bellows passageway 320. The rigid inner sleeve 335 is fixed to the first flange 325 by a mounting structure 336. The mounting structure 336 is coupled to the first end 317 of the flexible bellows 315, and the first end 317 is directly joined to the first flange 325. With additional reference to FIG. 3B, the rigid inner sleeve 335 is cylindrically shaped with a circular cross-section taken in the XY plane. The rigid inner sleeve 335 is made of a rigid material that is not reactive with fluid that passes through the bellows passageway 320. For example, the rigid inner sleeve 335 can be made of a metal such as molybdenum, aluminum or, copper or other suitable materials such as but not limited to aluminum oxide, diamond, and graphite. The rigid inner sleeve 335 can have an inner surface 338 (which defines the sleeve passageways 337) that is generally smooth.

Referring again to FIG. 3A, the shield device 340 is at least partly fixed to or supported by the second flange 330. The shield device 340 defines an axial device opening 3400 in fluid communication with the second opening 3300. The shield device 340 is positioned at the free end of the rigid inner sleeve 335 (the end nearest the second flange 330) so that the free end of the rigid inner sleeve 335 extends through the axial device opening 3400.

The shield device 340 includes at least one movable disk 344 and a disk housing 342 configured to retain the disk 344. The disk housing 342 includes a first side 346a and a second side 346b. The first side 346a of the shield device 340 is fixed to the second end 319 of the flexible bellows 340, and the second side 346b is fixed to the second flange 330 by a mounting region 327. The fixing can be by way of a vacuum seal. In particular, the first side 346a can be vacuum sealed to the second end 319 of the flexible bellows 340 and the second side 346b can be vacuum sealed to the second flange 330.

Figure 3C:
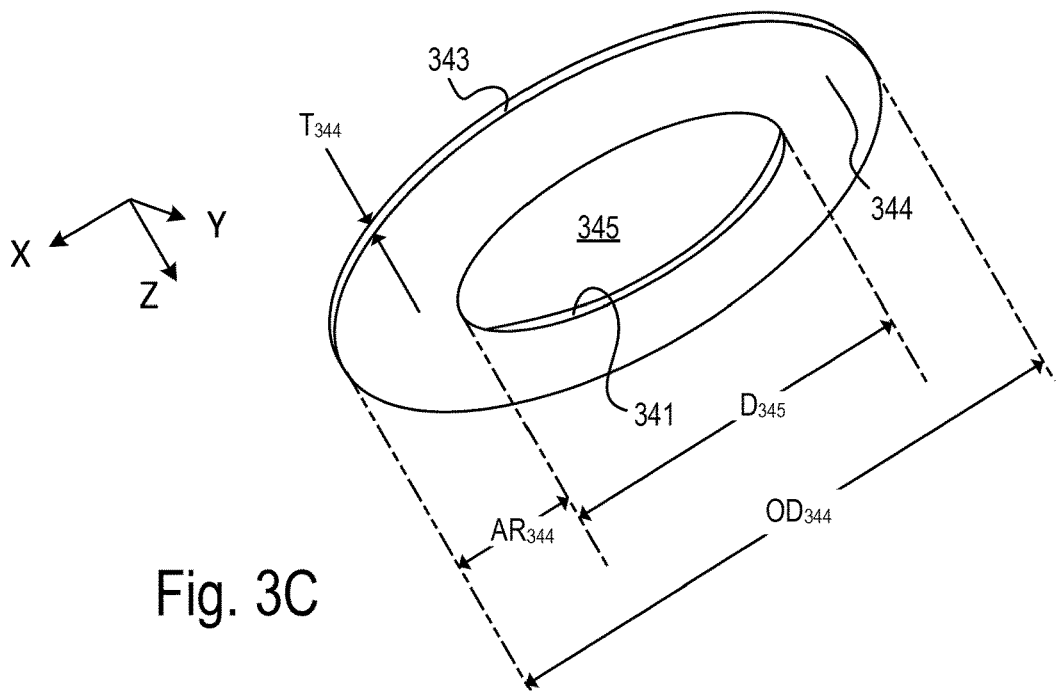
FIG. 3C is a perspective view of an implementation of a disk used in the shield device of the apparatus of FIG. 3A.
Figure 3H:
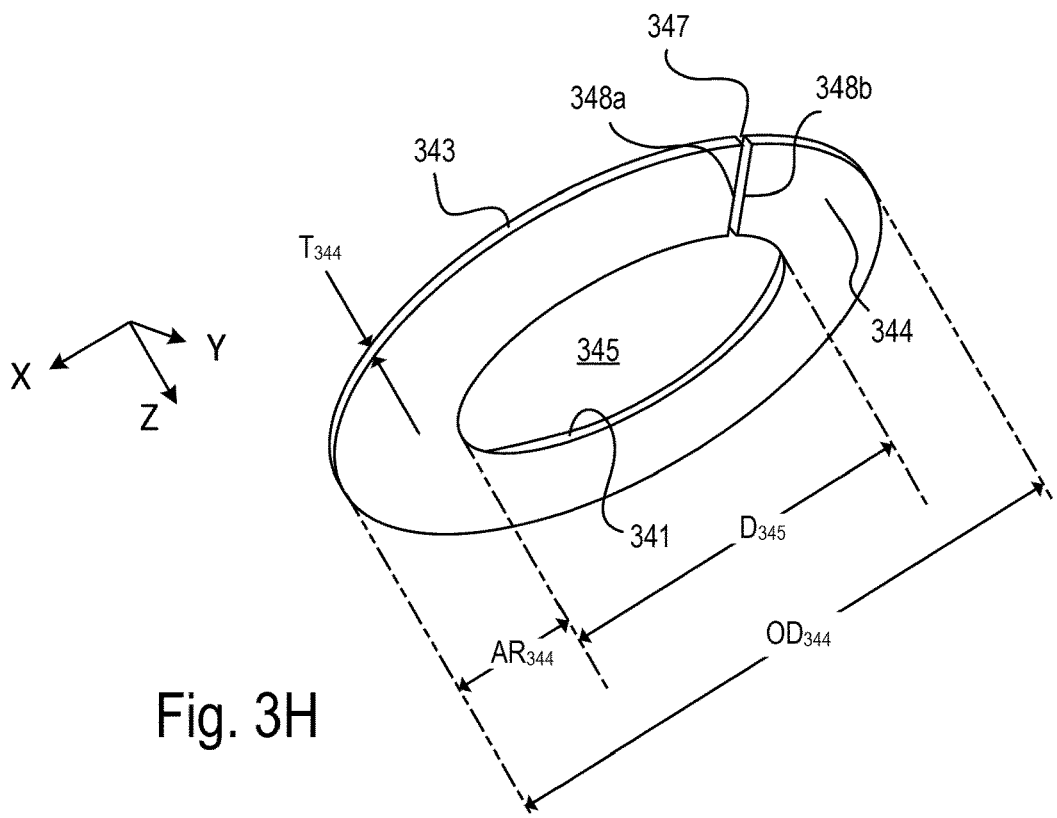
FIG. 3H is a perspective view of another implementation of a disk used in the shield device of the apparatus of FIG. 3A.
Figure 3D:
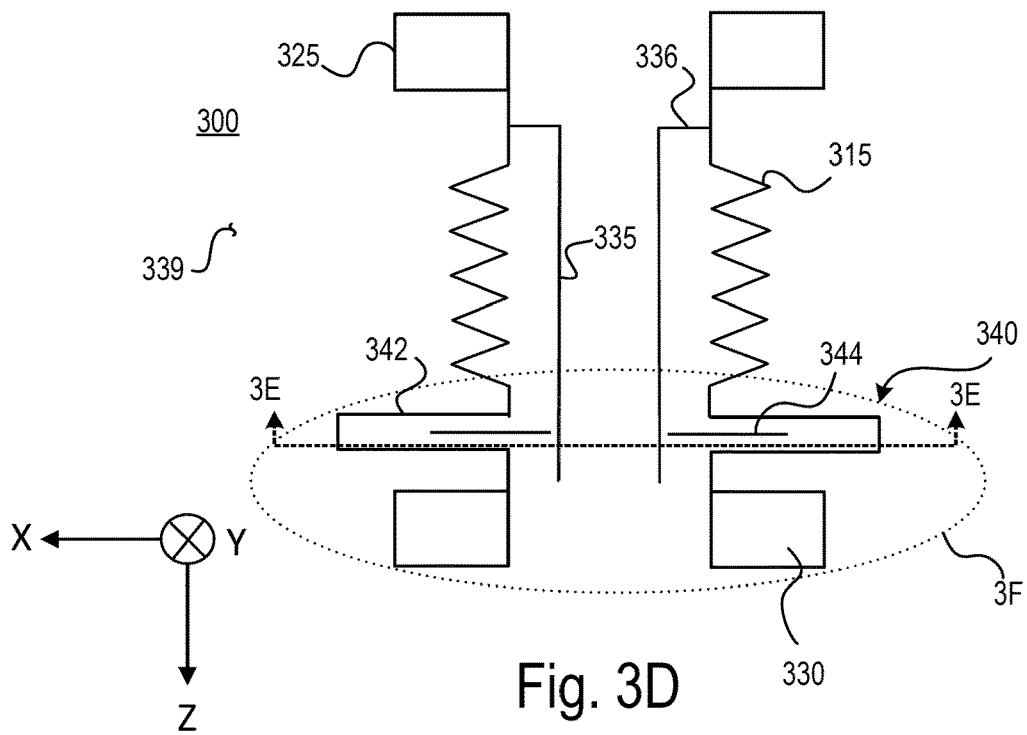
FIG. 3D is a side cross-sectional view of the apparatus of FIG. 3A.
Figure 3E:
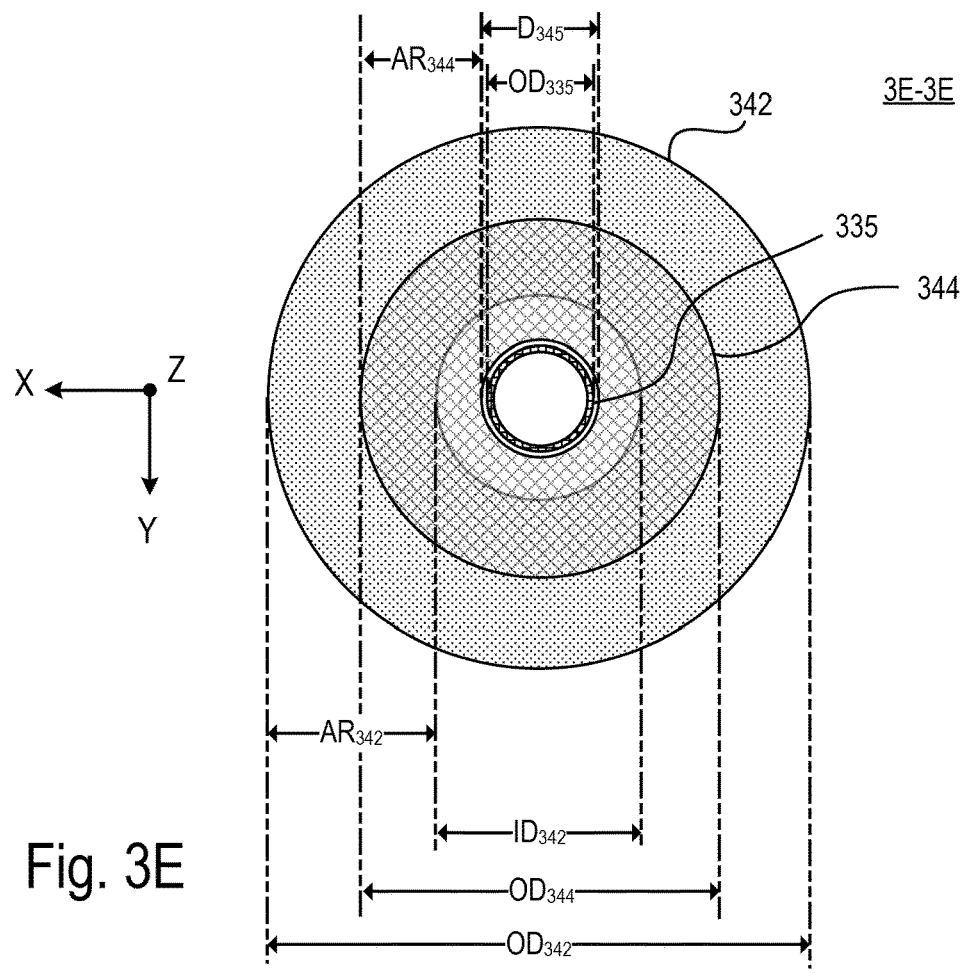
FIG. 3E is a plan view along the XY plane at plane 3E-3E of FIG. 3D, the plan view including a disk housing, a disk, and a rigid inner sleeve of the apparatus of FIG. 3D.
Figure 3F:
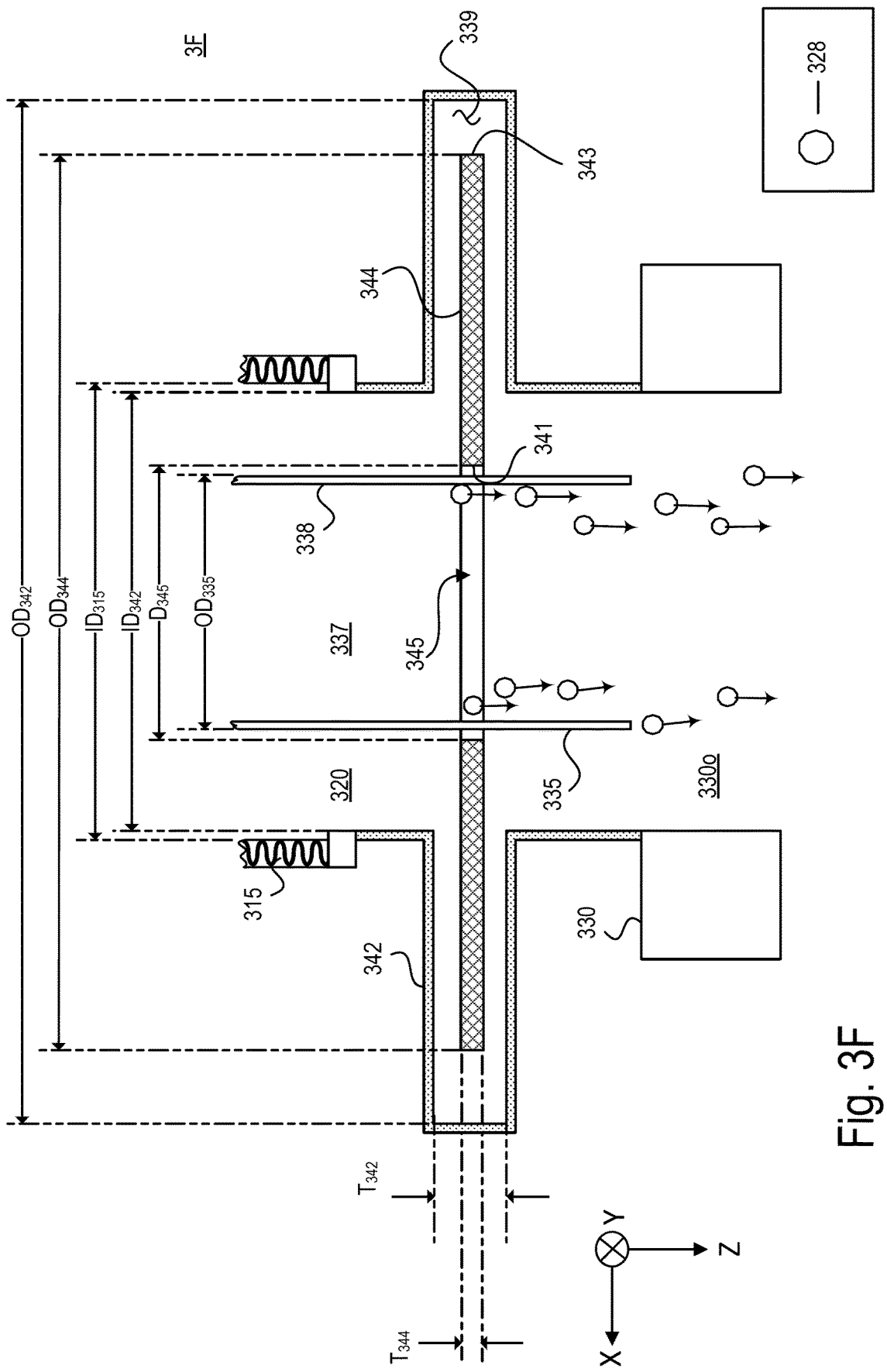
FIG. 3F is a side cross-sectional view showing an implementation of a section 3F of the apparatus of FIG. 3D.

Referring specifically to FIGS. 3D and 3F, so as not to obstruct fluid flow through the apparatus 300 and to enable relative motion between the first and second flanges 325, 330, the disk housing 342 is annular in shape and thus defines the axial device opening 3400 through which the rigid inner sleeve 335 can pass. The axial device opening 3400 is defined by an inner diameter $ID_{342}$ that is on the order of or about the same extent as an inner diameter $ID_{315}$ of the flexible bellows 315. The inner diameters $ID_{342}$ and $ID_{315}$ can be about the same size as the diameter of the opening 3300. The disk housing 342 has an annular radius $AR_{342}$ (FIG. 3E), which is given by one half of the distance between an outer circumferential edge (defining the outer diameter $OD_{342}$) of the disk housing 342 and an inner circumferential edge (defining an inner diameter $ID_{342}$ of the axial opening 3400).

Referring to FIGS. 3C-3F, the disk 344 has a generally flat shape along the axial direction $B_A$ when inserted into the disk housing 342. The disk 344 is retained in the disk housing 342 so that the disk 344 is able to move along a direction within the XY plane.

In the implementation shown in FIGS. 3A-3F, in which only one disk 344 is retained in the disk housing 342, an outer diameter $OD_{344}$ of the disk 344 is greater than the inner diameter $ID_{342}$ of the disk housing 342 so that the disk 344 does not become removed from or askew within the disk housing 342, which could cause the disk 344 to become jammed and unable to move. Moreover, to enable the disk 344 to move freely in the XY plane and to move far enough within the XY plane to enable the full range of relative motion between the first and second flanges 325, 330, the outer diameter $OD_{344}$ of the disk 344 should be less than the outer diameter $OD_{342}$ of the disk housing 342. The larger the difference between the outer diameter $OD_{342}$ of the disk housing 342 and the outer diameter $OD_{344}$ of the disk 344, the larger the range of motion of the disk 344 within the XY plane.

The disk 344 is annular in shape and thus defines a central opening 345 through which the rigid inner sleeve 335 can pass. To enable the rigid inner sleeve 335 to pass through the central opening 345, the diameter $D_{345}$ of the central opening 345 is larger than the outer diameter $OD_{335}$ of the rigid inner sleeve 335. An annular radius $AR_{344}$ of the disk 344 is given by one half of the distance between an outer circumferential edge 343 (defining the outer diameter $OD_{344}$) of the disk 344 and an inner circumferential edge 341 (defining diameter $D_{345}$ of the central opening 345).

Figure 3G:
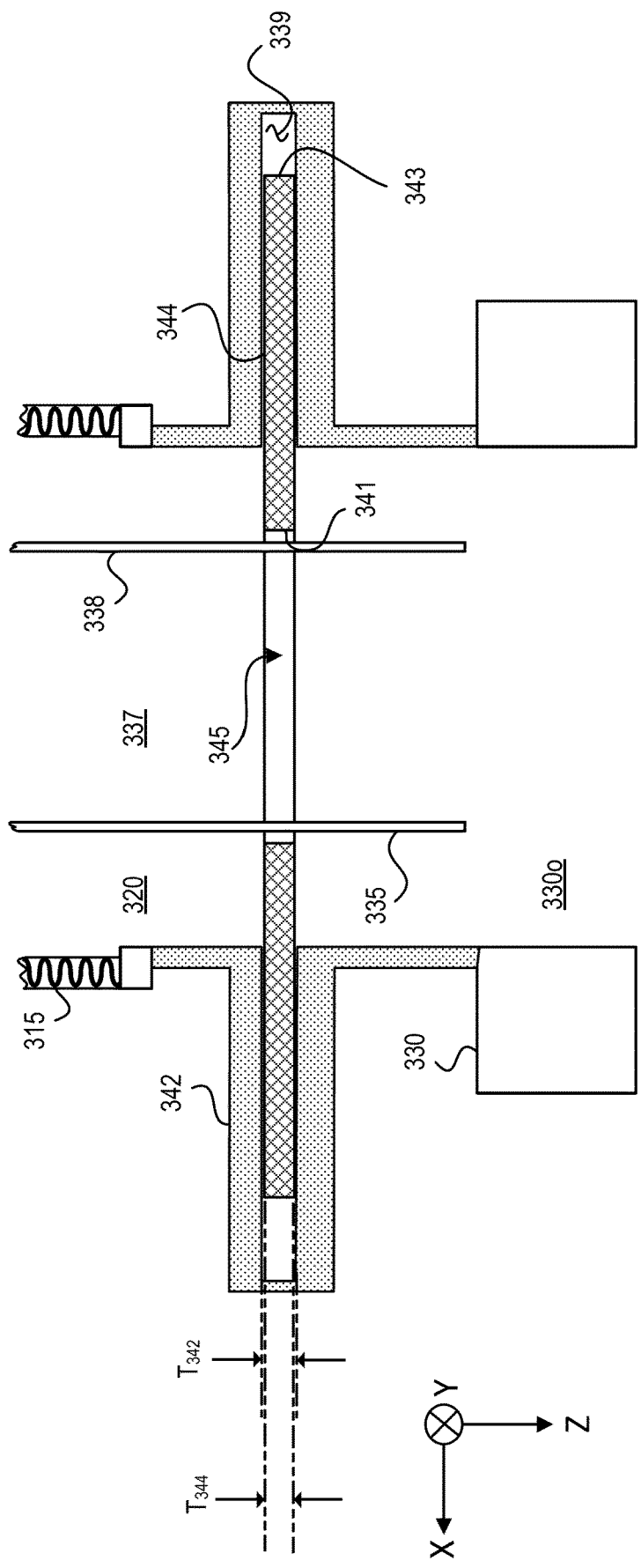
FIG. 3G is a side cross-sectional view showing another implementation of the section 3F of the apparatus of FIG. 3D.

Referring to FIGS. 3C, 3D, and 3F, the disk 344 is defined by a thickness $T_{344}$ taken along the Z axis, which is parallel with the axial direction $B_A$ when the disk 344 and the shield device 340 are attached within the apparatus 300. This thickness $T_{344}$ is less than a thickness $T_{342}$ of an interior cavity 339 of the disk housing 342 taken along the Z axis. The difference between the thickness $T_{342}$ of the interior cavity 339 of the disk housing 342 and the thickness $T_{344}$ of the disk 344 should be great enough to enable the free movement of the disk 344 along the XY plane within the interior cavity 339 of the disk housing 342. Additionally, the difference between the thickness $T_{342}$ of the interior cavity 339 of the disk housing 342 and the thickness $T_{344}$ of the disk 344 should be small enough to at least partly constrain the disk 344 from excessive motion along the Z axis when the disk 344 is inside the disk housing 342. A notable gap between the disk housing 342 and the disk 344 is shown in FIGS. 3A, 3D, and 3F to facilitate clarity in the drawings; nevertheless, it is possible for the disk 344 to be in contact with or much closer to the disk housing 342, as shown in FIG. 3G.

Referring to FIG. 3H, in some implementations, the disk 344 includes a slit 347 that extends radially between the outer edge 343 (defining the outer diameter $OD_{344}$) of the disk 344 and the inner edge 341 (defining the central opening 345 of the disk 344). In other words, the disk 344 is cut from the outer edge 343 of the disk 344 to the central opening 345 along the radial direction such that the slit 347 is formed. The slit 347 is formed by a first radial edge 348a and a second radial edge 348b of the disk 344. The first radial edge 348a and the second radial edge 348b can be moved relative to each other along the Z direction by bending the disk 344 to thereby form a gap between the first and second radial edges 348a, 348b extending along the Z direction. For example, the thickness $T_{344}$ of the disk 344 can be small enough that the disk 344 is flexible and can bend to allow the first radial edge 348a to move relative to the second radial edge 348b in the Z direction.

The slit 347 allows the disk 344 to be installed within the interior cavity 339 of the disk housing 342. The gap is formed between the first radial edge 348a and the second radial edge 348b in the Z direction when the first and second radial edges 348a, 348b are moved relative to each other. The gap between the first and second radial edge 348a, 348b allows a portion of the disk 344 including the first radial edge 348a to be installed in the interior cavity 339 of the disk housing 342 before the remaining portion of the disk 344 including the second radial edge 348b is installed into the disk housing 342. Specifically, the first radial edge 348a can be passed through the opening 3300 of the second flange 330 and through the axial device opening 3400 to install the portion of the disk 344 including the first radial edge 348a into the interior cavity 339 of the disk housing 342. The disk 344 can then be rotated about the axial direction $B_A$ to install the remaining portion of the disk 344 including the second radial edge 348b into the interior cavity 339 of the disk housing 342. In this way, the slit 347 allows the disk 344 that is defined by the outer diameter $OD_{344}$ that is greater than the inner diameter $ID_{342}$ of the disk housing 342 to be installed within the disk housing 342.

The shield device 340 including the disk 344 and the disk housing 342 can be made of material that is rigid and not reactive to the fluid passing through the apparatus 300. For example, the disk 344 and the disk housing 342 can be made of a metal such as stainless steel. In implementations of the disk 344 that include the slit 347, the disk 344 can be made of a metal that is pliable and bends and returns to its original shape after forces are applied to the disk 344 to deform the disk 344. Thus, the disk 344 can be made of stainless steel that is defined by a thickness $T_{344}$ that is much smaller than the outer diameter $OD_{344}$.

Additionally, one or more of the disk 344 and the disk housing 342 (of the shield device 340) can also include a coating configured to prevent particulates from contaminating the shield device 340. For example, the shield device 340 coating can be configured to repel fluid particles to prevent the fluid particles from accumulating on the shield device 340 and to prevent solid particles from sticking to the shield device 340. The shield device 340 coating can be, for example, a nitride such as a metal nitride or a metalloid nitride. The coating on the disk 344 and/or the disk housing 342 can also act to prevent corrosion of the underlying material (which can be stainless steel), such corrosion being caused by contamination by the particulates.

If the particulates are formed from target material with a chamber of an EUV light source, then the shield device 340 coating can be selected so as to be compatible with and/or to repel the target material.

The rigid inner sleeve 335 can also include a coating configured to prevent particulates 328 from contaminating one or more of the shield device 340 and the rigid inner sleeve 335 during operation. As discussed above, particulates 328 can include one or more of solid particles, fluid particles, and splashes of the fluid that pass through the sleeve passageway 337. For example, the rigid inner sleeve 335 coating can be configured to repel the fluid particles to prevent the fluid particles from accumulating on the shield device 340 and the rigid inner sleeve 335. The rigid inner sleeve 335 coating can be, for example, a metal nitride or a silicon nitride. If the particulates are formed from target material with a chamber of an EUV light source, then the rigid inner sleeve 335 coating can be selected so as to be compatible with and/or to repel the target material.

In particular, and with reference to FIG. 3F, the rigid inner sleeve 335 coating can be configured to repel the particulates 328 (such as fluid particles) along a direction that is parallel to the axial direction $B_A$ or away from the shield device 340. In particular, when a fluid propagates through the sleeve passageway 337, the fluid particles that detach from the coating on the smooth inner surface 338 detach in a manner such that their propagation direction is parallel with the axial direction $B_A$ or away from the components (the disk 344 and the disk housing 342) of the shield device 340, as shown in FIG. 3F. The rigid inner sleeve 335 coating can also be configured to prevent the solid particles from sticking to the shield device 340 and the rigid inner sleeve 335. As another example, the rigid inner sleeve 335 coating can be configured to prevent corrosion of an exterior surface (such as a surface of the disk 344 or the disk housing 342) of the shield device 340 that is caused by the contamination of the particulates.

In operation, the rigid inner sleeve 335 is configured to physically block particulates from reaching the flexible bellows 315 by maintaining particulates that travel between structures or parts through the apparatus 300 within the sleeve passageway 337 and separated from the flexible bellows 315. As described above, the functionality of the flexible bellows 315 permits relative movement between the first and second flanges 325, 330 that can be caused by thermal expansion or contraction of one or more of the structures fixed to each of the flanges 325, 330, and vibrations and positional deviations between the structures fixed to each of the flanges 325, 330. The upper end of the rigid inner sleeve 335 that is fixed to the first flange 325 moves with the first flange 325 and relative to the second flange 330 when each of the flanges 325, 330 moves relative to each other. In this way, as particulates 328 travel through the sleeve passageway 237 and each of the flanges 325, 330 moves relative to each other, the rigid inner sleeve 335 continues to block the particulates 328 from reaching the flexible bellows 315.

Furthermore, the lower end of the rigid inner sleeve 335 that is near the second flange 330 extends below the shield device 340 to physically block particulates 328 from contaminating the shield device 340. In addition, the shield device 340 prevents particulates 328 from traveling into the region between the flexible bellows 315 and the rigid inner sleeve 335 through an opening defined between the lower end of the rigid inner sleeve 335 (that is nearest to the second flange 330) and the second flange 330. Specifically, when the rigid inner sleeve 335 moves with the first flange 325 and relative to the second flange 330, the disk 344 also moves with the lower portion of the rigid inner sleeve 335 (that is near the second flange 330) relative to the second flange 330 and blocks particulates 328 from traveling into the opening 320 between the flexible bellows 315 and the rigid inner sleeve 335. As such, both of the rigid inner sleeve 335 and the shield device 340 physically block the particulates 328 from reaching and contaminating the flexible bellows 315 during operation. Details are provided next.

During operation, as discussed above with reference to FIGS. 2A and 2B, the relative movement between the first and second flanges 325, 330 can include linear motion along the axial direction $B_A$, translational motion along one or more directions that are perpendicular to the axial direction $B_A$, and rotational motion about one or more directions that are perpendicular to the axial direction $B_A$. The shield device 340 enables this relative movement between the first and second flanges 325, 330 while preventing the particulates 328 from entering the region between the rigid inner sleeve 335 and the flexible bellow 315 to thereby contaminate the flexible bellows 315.

Figure 4A:
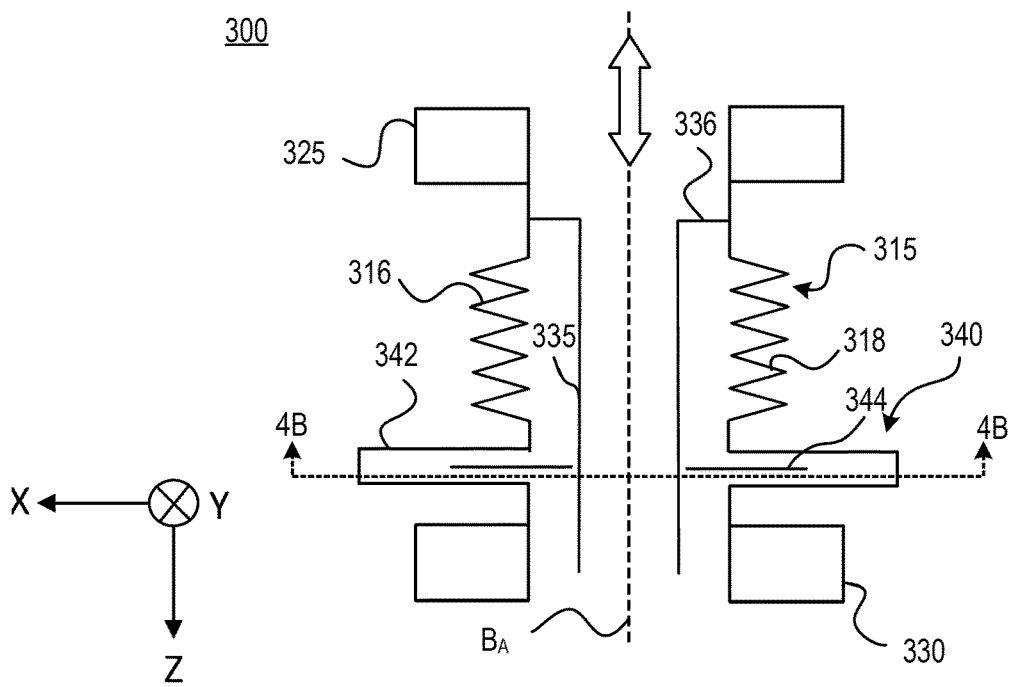
FIG. 4A is a side cross-sectional view of the apparatus of FIG. 3A, showing relative motion between first and second flanges attached to the mechanically insulating device along an axial direction.
Figure 4B:
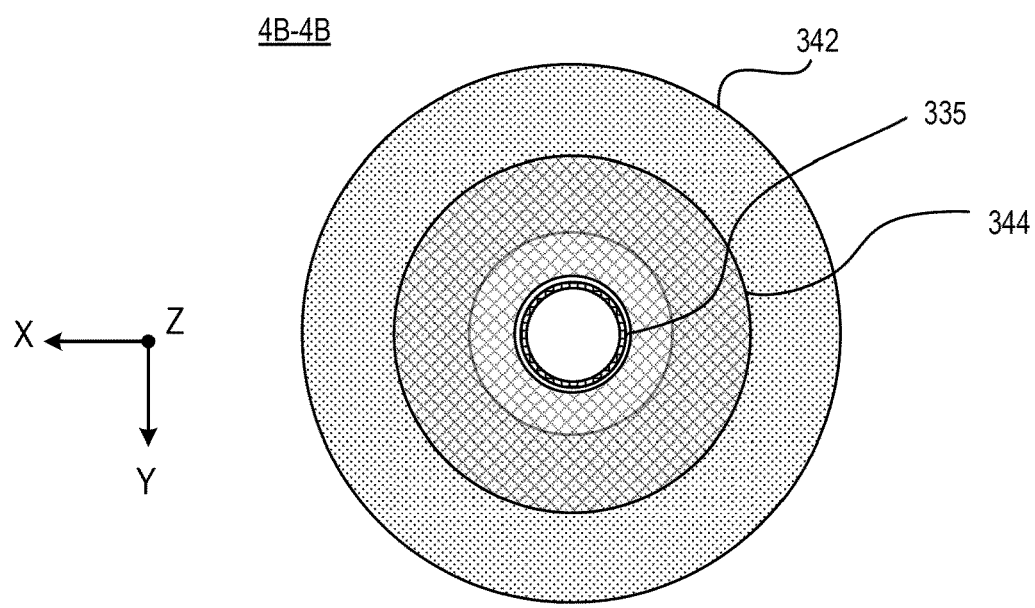
FIG. 4B is a plan view along the XY plane at plane 4B-4B of FIG. 4A, the plan view including a disk housing, a disk, and a rigid inner sleeve of the apparatus of FIG. 4A.

Referring to FIGS. 4A and 4B, the first and second flanges 325, 330 move relative to each other in a linear motion along the axial direction $B_A$. For example, the first flange 325 can move along the axial direction $B_A$ towards the second flange 330. The flexible bellows 315 expands and contracts along the axial direction $B_A$ allowing the first and second flanges 325, 330 to move relative to each other. As described above, the flexible bellows 315 expands and contracts by the folding and unfolding of the pleats 318 in the corrugated portion 316 of the flexible bellows 315. For example, the flexible bellows 315 contracts by the folding of the pleats 318 when the first and second flanges 325, 330 move towards each other along the axial direction $B_A$ and expands by the unfolding of the pleats 318 when the first and second flanges 325, 330 move away from each other along the axial direction $B_A$. Because the rigid inner sleeve 335 is fixed to the first flange 335, the rigid inner sleeve 335 moves with the first flange 325 and relative to the second flange 330 along the Z direction. For example, the rigid inner sleeve 335 can move with the first flange 325 along the Z direction towards the second flange 330.

The shield device 340 enables the relative linear motion between the first and second flanges 325, 330 along the axial direction $B_A$. Specifically, the rigid inner sleeve 335 that moves with the first flange 325 is enabled to move along the axial direction $B_A$ through the central opening 345 of the disk 344. Because the outer diameter $OD_{335}$ of the rigid inner sleeve 335 is smaller than the diameter $D_{345}$ of the central opening 345 of the disk 344, the rigid inner sleeve 335 is able to freely move along the Z direction relative to the disk 344. In this way, the shield device 340 enables the relative linear motion of the first and second flanges 325, 330 along the axial direction $B_A$ by allowing the rigid inner sleeve 335 to also move with the axial motion relative motion between the first flange 325 and the second flange 330. Additionally, as the rigid inner sleeve 335 moves relative to the second flange 330 in the axial direction $B_A$, the disk 344 continues to block particulates 328 from traveling into the region between the rigid inner sleeve 335 and the flexible bellows 315. Thus, the shield device 340 prevents the particulates 328 from contaminating the flexible bellows 315 when the first and second flanges 325, 330 move relative to each other along the axial direction $B_A$.

Figure 5A:
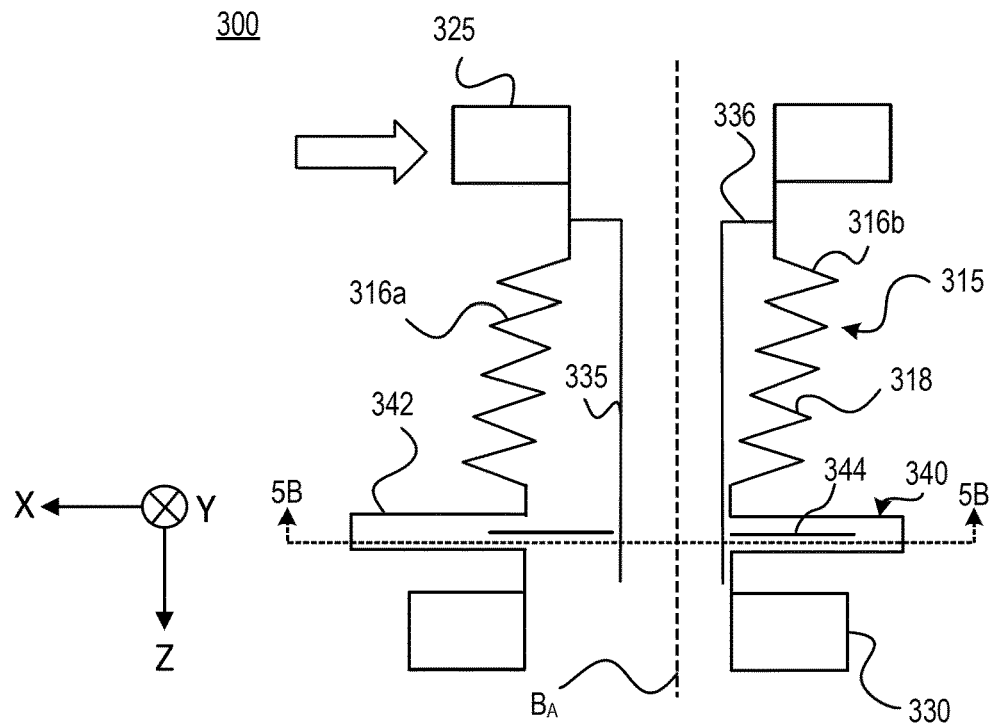
FIG. 5A is a side cross-sectional view of the apparatus of FIG. 3A, showing relative motion between first and second flanges attached to the mechanically insulating device, the relative motion being a translation motion along a direction that is perpendicular to the axial direction.
Figure 5B:
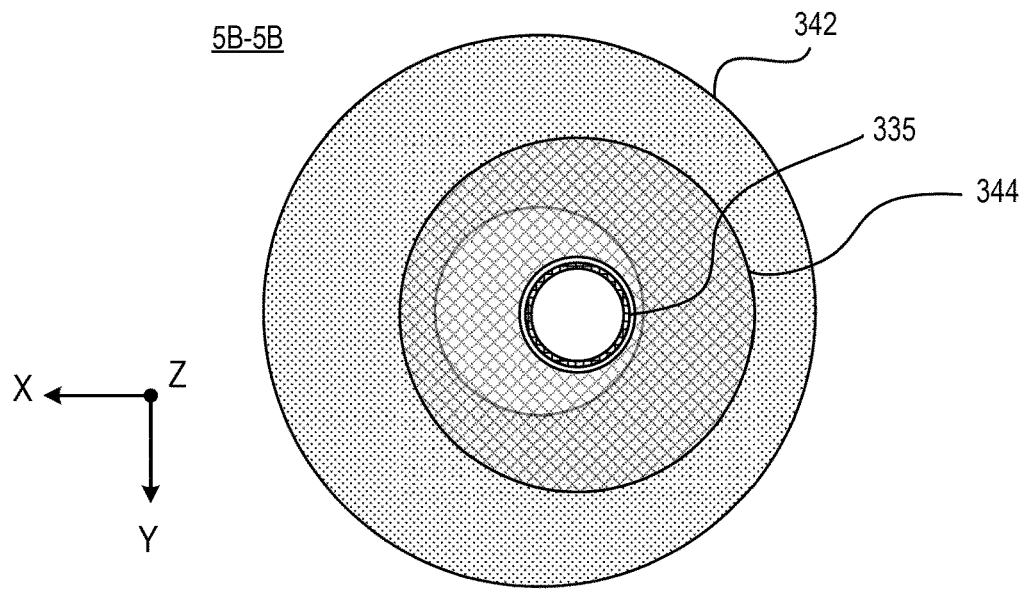
FIG. 5B is a plan view along the XY plane at plane 5B-5B of FIG. 5A, the plan view including a disk housing, a disk, and a rigid inner sleeve of the apparatus of FIG. 5A.

Referring to FIGS. 5A and 5B, the first and second flanges 325, 330 move relative to each other in a translational motion along the X direction that is perpendicular to the axial direction $B_A$. For example, as shown in FIG. 5A, the first flange 325 can move along the −X direction relative to the second flange 330. A portion or side of the flexible bellows 315 expands generally along the axial direction $B_A$ while another portion or side of the flexible bellows 315 contracts, thus allowing the first and second flanges 325, 330 to move relative to each other. For example, a corrugated portion 316a of the flexible bellows 315 expands by the unfolding of the pleats 318 while a corrugated portion 316b of the flexible bellows 315 contracts by folding the pleats 318 when the first flange 325 moves along the −X direction relative to the second flange 330. Because the rigid inner sleeve 335 is fixed to the first flange 335, the rigid inner sleeve 335 moves with the first flange 325 relative to the second flange 330 along the −X direction. For example, the rigid inner sleeve 335 can move with the first flange 325 along the −X direction relative to the second flange 330.

The shield device 340 enables and facilitates the relative translational motion between the first and second flanges 325, 330 along the XY plane. Specifically, because the disk 344 is enabled to move along the X direction (and in the XY plane) within the interior cavity 339 of the disk housing 342, the rigid inner sleeve 335 that moves with the first flange 325 is also enabled to move along the X direction while remaining within the opening 345 of the disk 344. In other words, the disk 344 does not prevent or constrain the rigid inner sleeve 335 from moving in the X direction. Thus, as the first flange 325 and the rigid inner sleeve 335 move along the X direction relative to the second flange 330, the disk 344 is also prompted to move along the X direction by the movement of the rigid inner sleeve 335. In this way, the shield device 340 enables the relative translational motion of the first and second flanges 325, 330 along the X direction that is perpendicular to the axial direction $B_A$ by allowing the rigid inner sleeve 335 to also move with the first flange 325.

Additionally, as the rigid inner sleeve 335 moves relative to the second flange 330 in the X direction, the disk 344 continues to block particulates 328 from traveling into the region between the rigid inner sleeve 335 and the flexible bellows 315. Because the disk 344 moves with the rigid inner sleeve 335 and the first flange 325 in the −X direction relative to the second flange 330, the disk 344 continues to radially span the gap between the rigid inner sleeve 335 and the flexible bellows 315. Thus, the shield device 340 prevents the particulates 328 from contaminating the flexible bellows 315 when the first and second flanges 325, 330 move relative to each other translationally along the XY plane. In other examples, the shield device 340 can similarly enable relative translational motion of the first and second flanges 325, 330 along any direction that is perpendicular to the axial direction $B_A$ such as, for example, the Y direction or a direction in the XY plane. In these examples, the shield device 340 prevents the particulates 328 from contaminating the flexible bellows 315 in the same manner as described above.

Figure 6A:
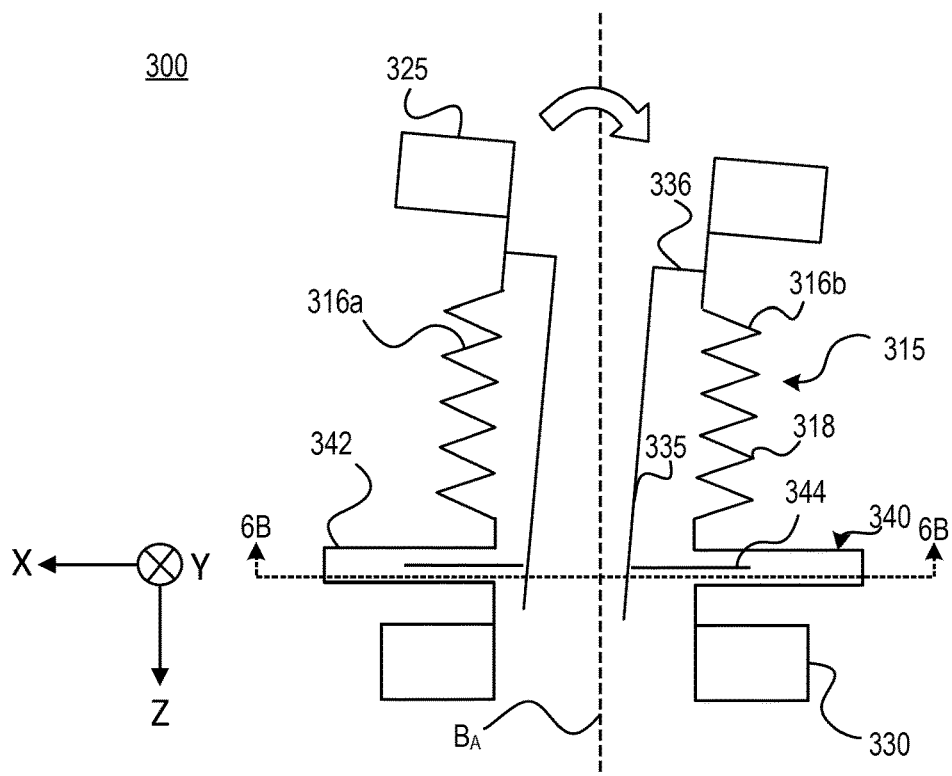
FIG. 6A is a side cross-sectional view of the apparatus of FIG. 3A, showing relative motion between first and second flanges attached to the mechanically insulating device, the relative motion being a rotation motion about a direction that is perpendicular to the axial direction.
Figure 6B:
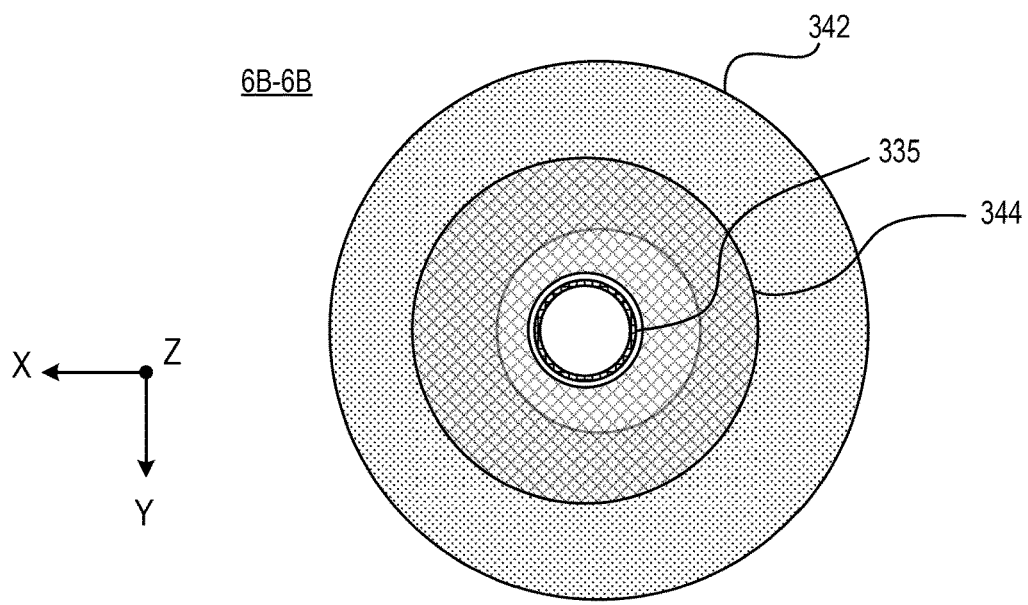
FIG. 6B is a plan view along the XY plane at plane 6B-6B of FIG. 6A, the plan view including a disk housing, a disk, and a rigid inner sleeve of the apparatus of FIG. 6A.

Referring to FIGS. 6A and 6B, the first and second flanges 325, 330 move relative to each other in a rotational motion about a direction (such as the Y direction) that is perpendicular to the axial direction $B_A$. For example, the first flange 325 can rotate about the Y direction relative to the second flange 330. The flexible bellows 315 expands generally along the axial direction $B_A$ at the corrugated portion 316a of the flexible bellows 315 and contracts generally along the axial direction $B_A$ at the corrugated portion 316b of the flexible bellows 315 allowing the first and second flanges 325, 330 to rotate relative to each other. For example, the flexible bellows 315 expands by the unfolding of the pleats 318 at the portion 316a of the flexible bellows 315 and contracts by the folding of the pleats 318 at the portion 316b of the flexible bellows 315. Because the rigid inner sleeve 335 is fixed to the first flange 335, the rigid inner sleeve 335 rotates with the first flange 325 relative to the second flange 330 about the Y direction. For example, the rigid inner sleeve 335 can rotate with the first flange 325 about the Y direction such that the lower portion of the rigid inner sleeve 335 (that is near the second flange 330) is rotated (and also translated) relative to the second flange 330.

The shield device 340 enables a tilting between the first and second flanges 325, 330, which involves the relative rotational motion between the first and second flanges 325, 330 about the direction perpendicular to the axial direction $B_A$ (such as the Y direction in this example). Specifically, because the disk 344 is enabled to move along the XY plane within the interior cavity 339 of the disk housing 342, the lower portion of the rigid inner sleeve 335 that is moved by the rotation of the first flange 325 about the Y direction is also enabled to rotate. In other words, the disk 344 does not prevent the lower portion of the rigid inner sleeve 335 from rotating. Thus, as the first flange 325 and the rigid inner sleeve 335 rotate about the Y direction relative to the second flange 330, the disk 344 is also prompted to move along the X direction by the movement of the lower portion of the rigid inner sleeve 335. In this way, the shield device 340 enables the relative rotational motion of the first and second flanges 325, 330 about the Y direction that is perpendicular to the axial direction $B_A$ by allowing the rigid inner sleeve 335 to also move with the first flange 325.

Additionally, as the lower portion of the rigid inner sleeve 335 rotates relative to the second flange 330, the disk 344 continues to block particulates 328 from traveling into the region between the rigid inner sleeve 335 and the flexible bellows 315. Because the disk 344 moves with the lower portion of the rigid inner sleeve 335 in the X direction, the disk 344 continues to radially span the gap between the rigid inner sleeve 335 and the flexible bellows 315. Thus, the shield device 340 prevents the particulates 328 from contaminating the flexible bellows 315 when the first and second flanges 325, 330 are rotated relative to each other about the Y direction. In other examples, the shield device 340 can similarly enable relative rotational motion of the first and second flanges 325, 330 about any other direction that is perpendicular to the axial direction $B_A$ such as, for example, about the X direction or about a direction in the XY plane. In these examples, the shield device 340 prevents the particulates 328 from contaminating the flexible bellows 315 in the same manner as described above.

Figure 7A:
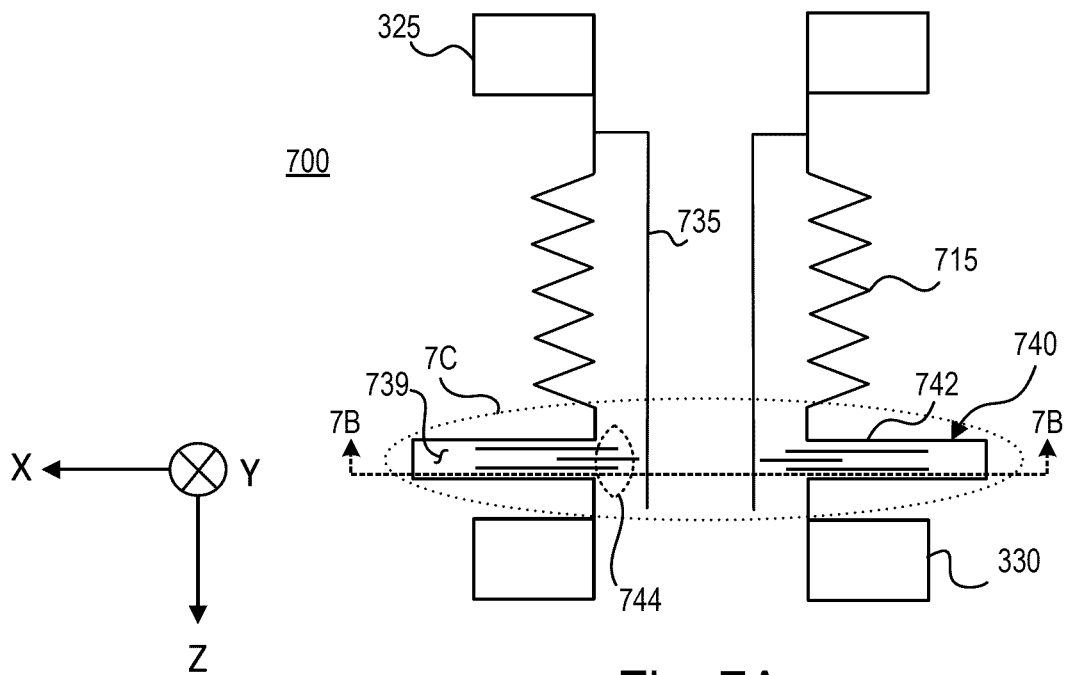
FIG. 7A is a side cross-sectional view of another implementation of the apparatus of FIG. 1, in which the shield device includes a plurality of disks seated in a disk housing.
Figure 7B:
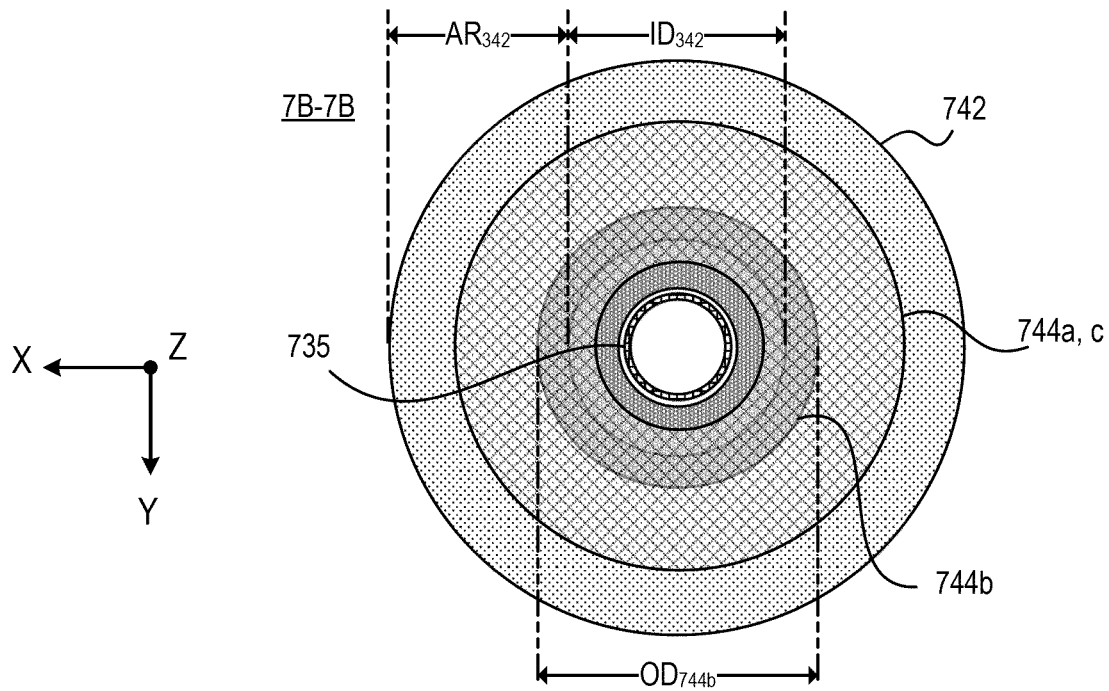
FIG. 7B is a plan view along the XY plane at plane 7B-7B of FIG. 7A, the plan view including the disk housing, the disks, and a rigid inner sleeve of the apparatus of FIG. 7A.

Referring to FIGS. 7A and 7B, an apparatus 700 is designed similarly to the apparatus 300 except that the apparatus 700 includes a plurality (or stack) 744 of disks 744a, 744b, 744c positioned within an interior cavity 739 of a disk housing 742. The disks 744a, 744b, 744c are layered or stacked adjacently to each other along the Z direction. Each of the disks 744a, 744b, 744c in the stack 744 is designed similarly to the disk 344 in that each disk 744a, 744b, 744c includes a respective central opening 745a, 745b, 745c that is large enough to accommodate the inner rigid sleeve 735. Thus, a diameter $D_{745a}$, $D_{745b}$, $D_{745c}$ of each central opening 745a, 745b, 745c is greater than an outer diameter $OD_{735}$ of the rigid inner sleeve 735.

In some implementations, at least one of the disks (for example, disk 744b) has an outer diameter $OD_{744b}$ that is different from an outer diameter of each other disk (such as outer diameter $OD_{744a}$ and $OD_{744c}$ of respective disks 744a and 744c). In still further implementations, at least one disk (such as disk 744a) has an outer diameter $OD_{744a}$ that is equal to the outer diameter $OD_{744c}$ of another disk (such as disk 744c) and an inner diameter $D_{745a}$ that is equal to the inner diameter $D_{745c}$ of the other disk 744c. In these implementations, the disks 744a and 744c have the same annular radius.

The sum of the thicknesses T of each disk 744a, 744b, 744c taken along the axial direction $B_A$ is less than an extent of the interior cavity 739 along the axial direction $B_A$ to enable all of the disks 744a, 744b, 744c to fit within the interior cavity 739. Moreover, one or more of the disks 744a, 744b, 744c can include a slit (such as the slit 347 in disk 344 discussed above) that extends radially between the outer edge (defining the outer diameter OD) of that disk 744a, 744b, 744c and the inner edge (defining the central opening 745a, 745b, 745c of that disk). Such slit can function similarly to the function of the slit 347 to enable each disk 744a, 744b, 744c to be installed within the interior cavity 739 of the disk housing 742.

Figure 7C:
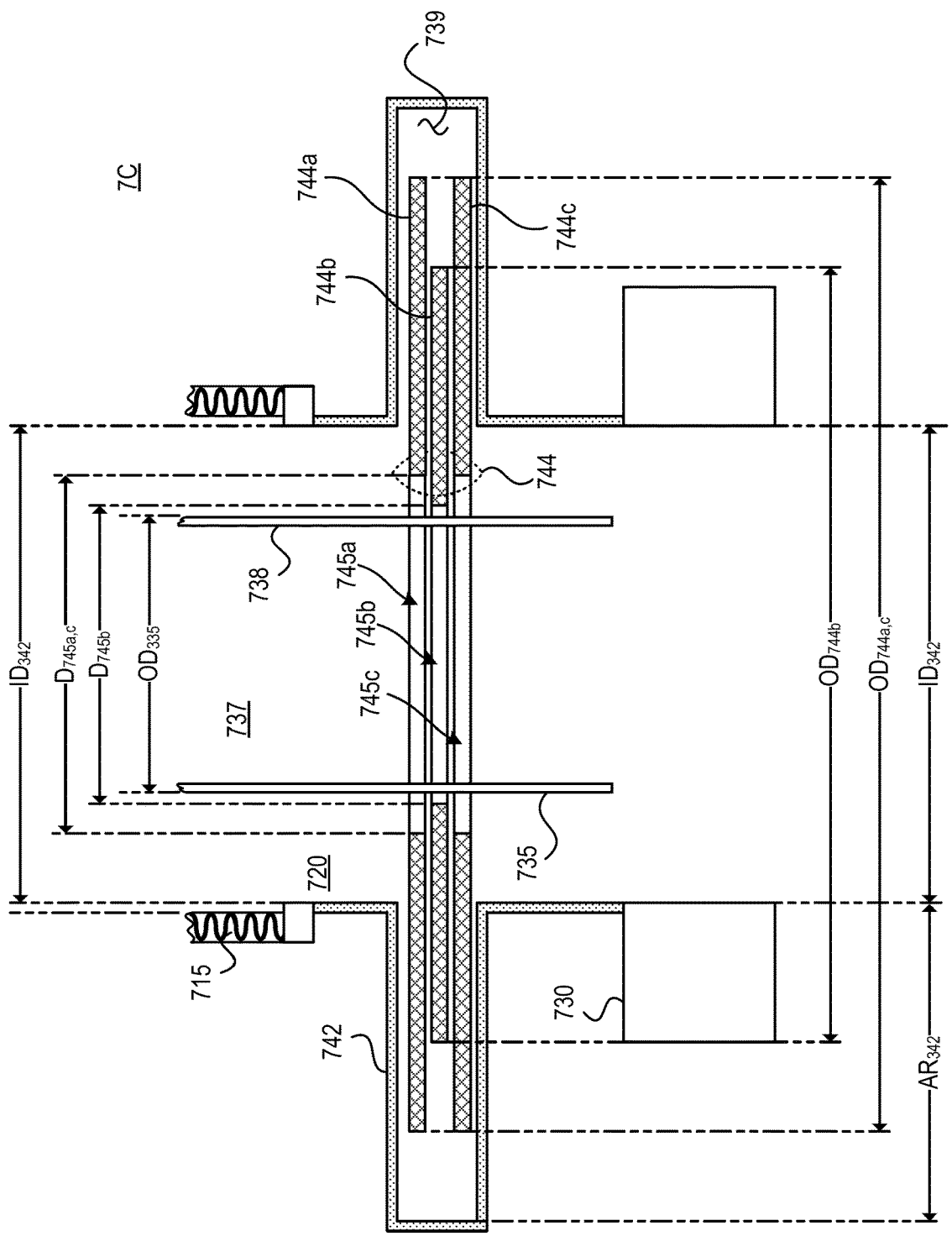
FIG. 7C is a side cross-sectional view showing an implementation of a section 7C of the apparatus of FIG. 7A.

In some implementations, one of the disks in the disk stack 744 is a small disk, such as disk 744b. This means that the disk 744b has an outer diameter $OD_{744b}$ that is less than a sum of an inner diameter $ID_{742}$ of the disk housing 742 plus an annular radius $AR_{742}$ of the disk housing 742 (FIGS. 7B and 7C). In this situation, the small disk 744b could be dislodged from or askew within the interior cavity 739, which could cause the disk 744b to be accidentally jammed and prevented from moving within the interior cavity 739. Accordingly, the disk 744b is placed between (sandwiched between) two large disks 744a, 744c, such large disks 744a, 744c each have respective outer diameters $OD_{744a}$, $OD_{744c}$ that are greater than the sum of the inner diameter $ID_{742}$ of the disk housing 742 plus the annular radius $AR_{742}$ of the disk housing 742 (FIGS. 7B and 7C).

In general, and with reference to FIGS. 8A and 8B, the use of a stack or plurality of disks of different inner and outer diameters, such as shown in FIG. 8B, can lead to an improvement in compactness of the disk housing and also facilitates installation of the disks through the opening 3300 of the second flange 330 when compared with just using one disk 344, such as used in the apparatus 300 and as shown in closer view in FIG. 8A. Specifically, FIG. 8A shows that the annular radius AR 342 of the disk housing 342 (in which a single disk 344 is placed) is substantially larger than an annular radius $AR_{842}$ of disk housing 842, in which two disks 844a, 844b of a stack 844 are placed. Additionally, the overall extent of the two disks 844a, 844b is given by their outer diameters and this overall extent is much smaller than the outer diameter $OD_{344}$ of the disk 344. Nevertheless, because the inner diameter $ID_{842}$ of the disk housing 842 is the same as the inner diameter $ID_{342}$ of the disk housing 342, it is easier to install the disks 844a, 844b in the interior cavity of the disk housing 842.

In general, for a disk stack such as the disk stack 744 or the disk stack 844, the inner and outer diameters of each disk can be chosen such that the disks in each stack overlap in all possible positions of the rigid inner sleeve 735 and also still cover the gap between the rigid inner sleeve 735 and the flexible bellows 715. In a most compact implementation, all of the disks in a disk stack have the same annular radius and the inner diameter of the nth disk is slightly smaller than the outer diameter of the (n−1)th disk, where n=1 denotes the disk with the smallest inner diameter that is slightly larger than the outer diameter of the rigid inner sleeve 735.

Figure 9A:
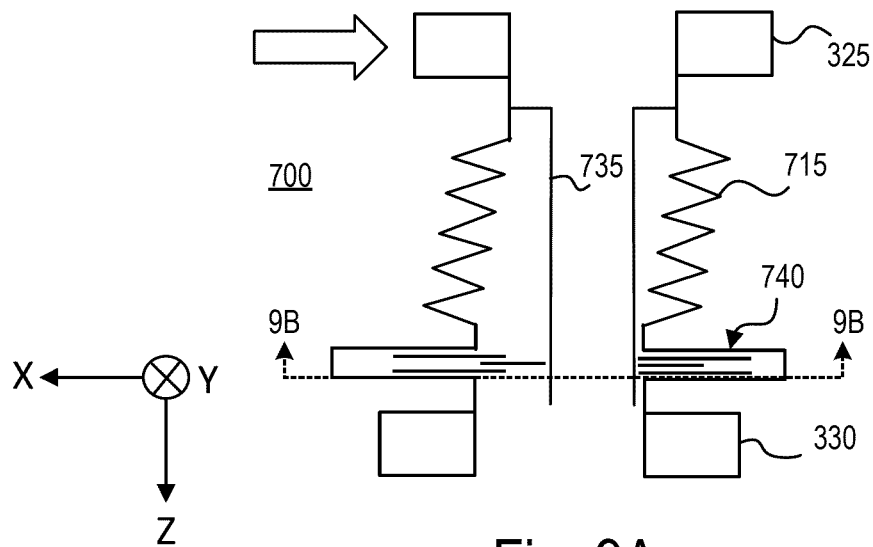
FIG. 9A is a side cross-sectional view of the apparatus of FIG. 7A, showing relative motion between first and second flanges attached to the mechanically insulating device, the relative motion being a translation motion along a direction that is perpendicular to the axial direction.
Figure 9B:
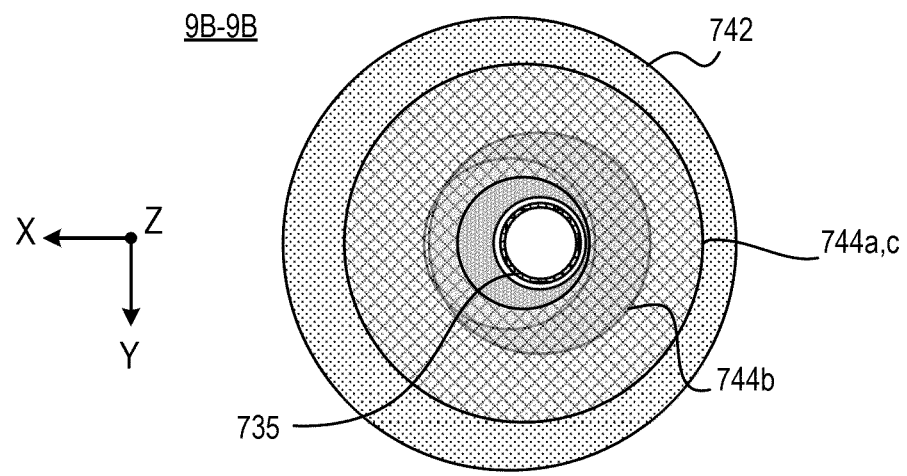
FIG. 9B is a plan view along the XY plane at plane 9B-9B of FIG. 9A, the plan view including the disk housing, the disks, and the rigid inner sleeve of the apparatus of FIG. 9A.

Referring to FIGS. 9A and 9B, a relative translational motion between the first and second flanges 325, 330 is shown with reference to the apparatus 700. The shield device 740 enables and facilitates the relative translational motion between the first and second flanges 325, 330 along the XY plane. Specifically, the small disk 744b, which hugs the rigid inner sleeve 735, moves with the rigid inner sleeve 735 along the −X direction. Moreover, the large disks 744a, 744c also move when engaged by the rigid inner sleeve 735. Because the large disks 744a, 744c each have respective outer diameters $OD_{744a}$, $OD_{744c}$ that are greater than the sum of the inner diameter $ID_{742}$ of the disk housing 742 plus the annular radius $AR_{742}$ of the disk housing 742 (FIGS. 7B and 7C), the small disk 744b is prevented from being dislodged from the interior cavity 739 of the shield device 740.

Additionally, as the rigid inner sleeve 735 moves relative to the second flange 330 in the X direction, the disk stack 744 continues to block particulates 328 from traveling into the region between the rigid inner sleeve 735 and the flexible bellows 715. Because the disks of the disk stack 744 move with the rigid inner sleeve 735 and the first flange 725 in the −X direction relative to the second flange 330, one or more of the disks 744a, 744b, 744c continues to radially span the gap between the rigid inner sleeve 735 and the flexible bellows 715. Thus, the shield device 740 prevents the particulates 328 from contaminating the flexible bellows 715 when the first and second flanges 325, 330 move relative to each other translationally along the XY plane. In other examples, as discussed above, the shield device 740 enables relative translational motion of the first and second flanges 325, 330 along any direction that is perpendicular to the axial direction $B_A$ such as, for example, the Y direction or a direction in the XY plane. In these examples, the shield device 740 prevents the particulates 328 from contaminating the flexible bellows 715 in the same manner as described above.

Figure 10A:
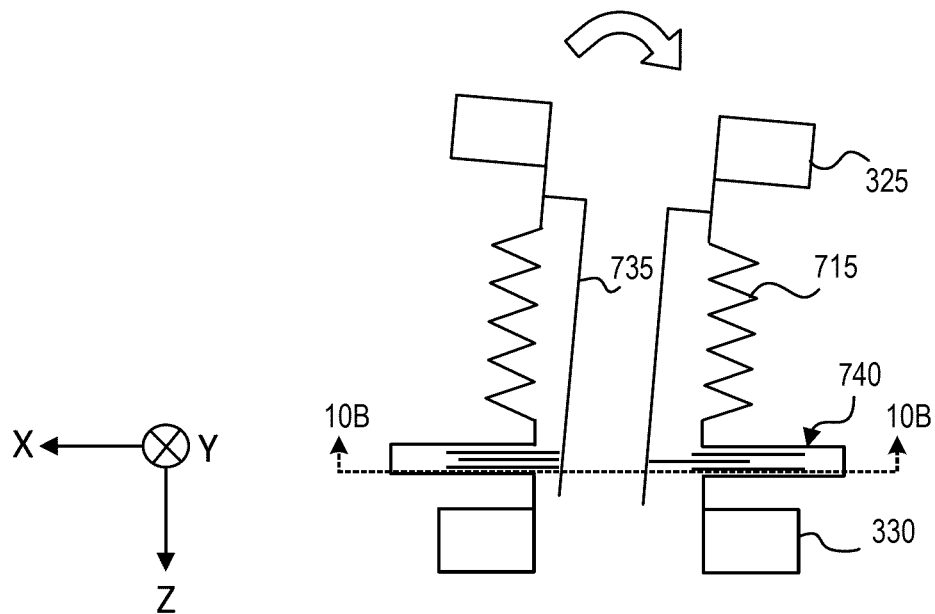
FIG. 10A is a side cross-sectional view of the apparatus of FIG. 7A, showing relative motion between first and second flanges attached to the mechanically insulating device, the relative motion being a rotation motion about a direction that is perpendicular to the axial direction.
Figure 10B:
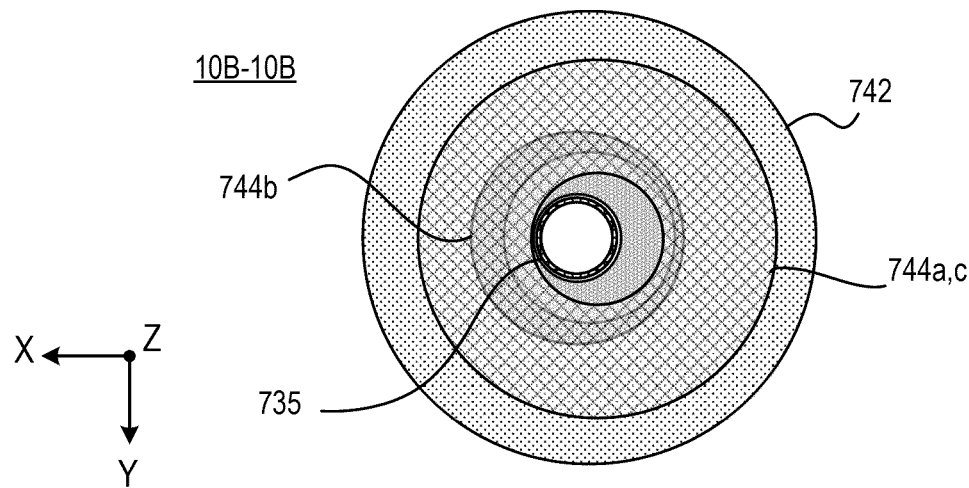
FIG. 10B is a plan view along the XY plane at plane 10B-10B of FIG. 10A, the plan view including the disk housing, the disks, and the rigid inner sleeve of the apparatus of FIG. 10A.

Referring to FIGS. 10A and 10B, a relative rotational motion between the first and second flanges 325, 330 is shown with reference to the apparatus 700. The first and second flanges 325, 330 move relative to each other in a rotational motion about a direction (such as the Y direction) that is perpendicular to the axial direction $B_A$. The flexible bellows 715 expands and contracts as discussed with reference to the flexible bellows 315 of FIG. 6A. Because the rigid inner sleeve 735 is fixed to the first flange 335, the rigid inner sleeve 735 rotates with the first flange 325 relative to the second flange 330 about the Y direction.

The shield device 740 enables the relative rotational motion between the first and second flanges 325, 330 about the direction perpendicular to the axial direction $B_A$ (such as the Y direction in this example). Specifically, the small disk 744b moves along the XY plane within the interior cavity 739 of the disk housing 742 as the rigid inner sleeve 735 is rotated. Specifically, the small disk 744b, which hugs the rigid inner sleeve 735, moves along the −X direction as the rigid inner sleeve 735 is rotated. Moreover, the large disks 744a, 744c also move when engaged by the rigid inner sleeve 735. Because the large disks 744a, 744c each have respective outer diameters $OD_{744a}$, $OD_{744c}$ that are greater than the sum of the inner diameter $ID_{742}$ of the disk housing 742 plus the annular radius $AR_{742}$ of the disk housing 742 (FIGS. 7B and 7C), the small disk 744b is prevented from being dislodged from the interior cavity 739 of the shield device 740.

Additionally, as the lower portion of the rigid inner sleeve 735 rotates relative to the second flange 330, the disk stack 744 continues to block particulates 328 from traveling into the region between the rigid inner sleeve 735 and the flexible bellows 715.

Figure 11A:
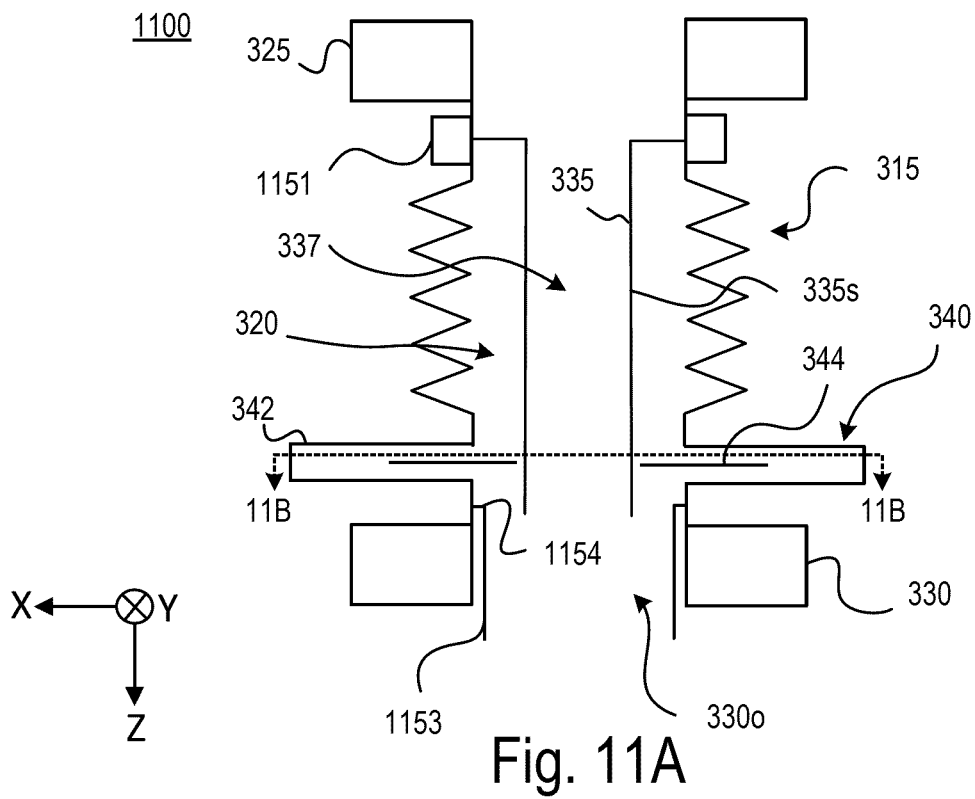
FIG. 11A is a side cross-sectional view of another implementation of the apparatus of FIG. 1, in which the apparatus includes a heating apparatus associated with the rigid inner sleeve and an inner guard associated with a second flange attached to the mechanically insulating device.
Figure 11B:
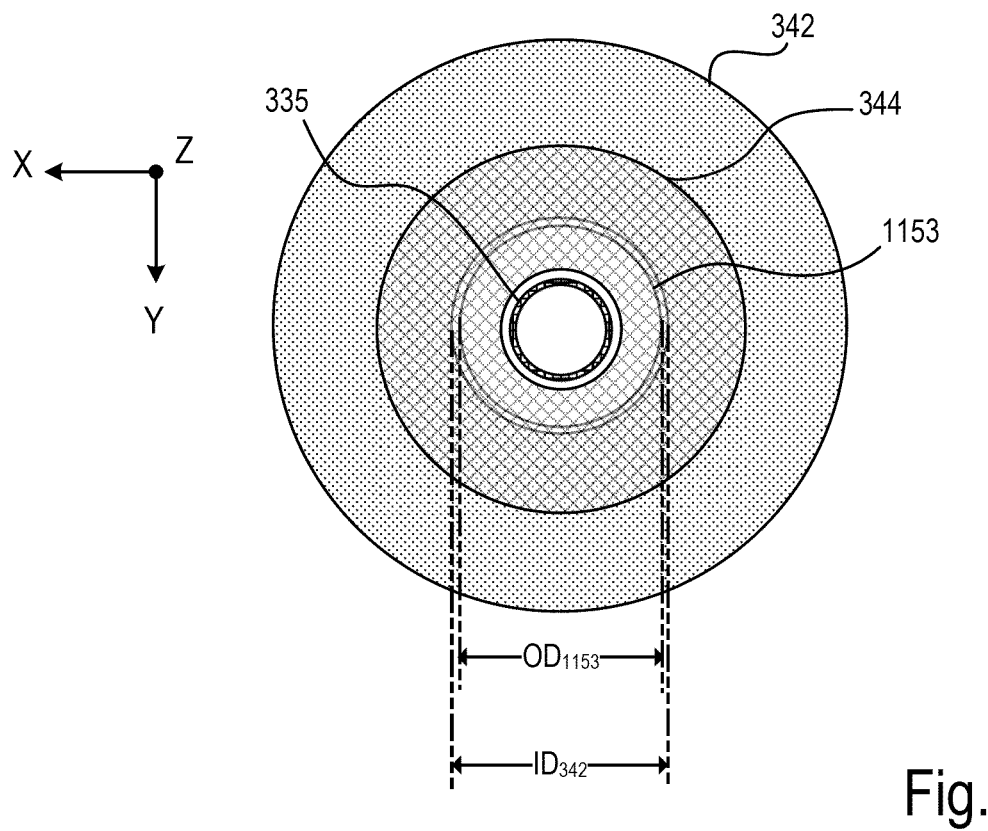
FIG. 11B is a plan view along the XY plane at plane 11B-11B of FIG. 11A, the plan view including the disk housing, the disk, the rigid inner sleeve, and the inner guard of the apparatus of FIG. 11A.

Referring to FIGS. 11A and 11B, an apparatus 1100 is designed similarly to the apparatus 300 except that the apparatus 1100 includes a heating apparatus 1151 and an inner guard 1153. The heating apparatus 1151 is configured to adjust and/or regulate a temperature of the rigid inner sleeve 335. The heating apparatus 1151 is in direct thermal communication with an outer surface 335s of the rigid inner sleeve 335 to adjust or control the temperature of the rigid inner sleeve 335 by thermal conduction. The heating apparatus 1151 is not in direct thermal communication with the flexible bellows 315. This means that the flexible bellows 315 is not substantially thermally affected by adjustments made by the heating apparatus 1151. For example, the flexible bellows 315 may be positioned farther away from the heating apparatus 1151 or the flexible bellows 315 may be made of a material having a reduced thermal conductivity.

The heating apparatus 1151 can include a plurality of discrete heating elements positioned at various positions relative to the outer surface 335s of the rigid inner sleeve 335 or can be a single heating element. By heating the outer surface 335s of the rigid inner sleeve 335, the heating apparatus 1151 also heats the sleeve passageway 337 such that the fluid that passes through the sleeve passageway 337 is heated during operation. This allows the fluid that passes through the apparatus 1100 to be transformed into or maintained in a melted, fluid, or molten state in which the fluid is able to flow. The heating also provides for melting or vaporizing any particles or other materials that contact the inner surface of rigid inner sleeve 335, such that they may be transported away with the fluid flow.

As described above, the rigid inner sleeve 335 is made of a rigid material that is not reactive with fluid that passes through the sleeve passageway 337. In the example of FIG. 11A, the rigid inner sleeve 335 can be made of a metal with a high thermal conductivity such that changes in temperature applied by the heating apparatus 1151 are efficiently conveyed to the rigid inner sleeve 335. For example, the rigid inner sleeve 335 can be made of a metal such as molybdenum, aluminum or copper, or other suitable materials such as aluminum oxide, diamond, or graphite. As described above, the rigid inner sleeve 335 also includes a coating configured to prevent the particulates 328 from contaminating one or more of the shield device 340 and the rigid inner sleeve 335. For example, the rigid inner sleeve 335 coating can be a metal nitride, a metal oxide, or a silicon nitride.

Figure 11C:
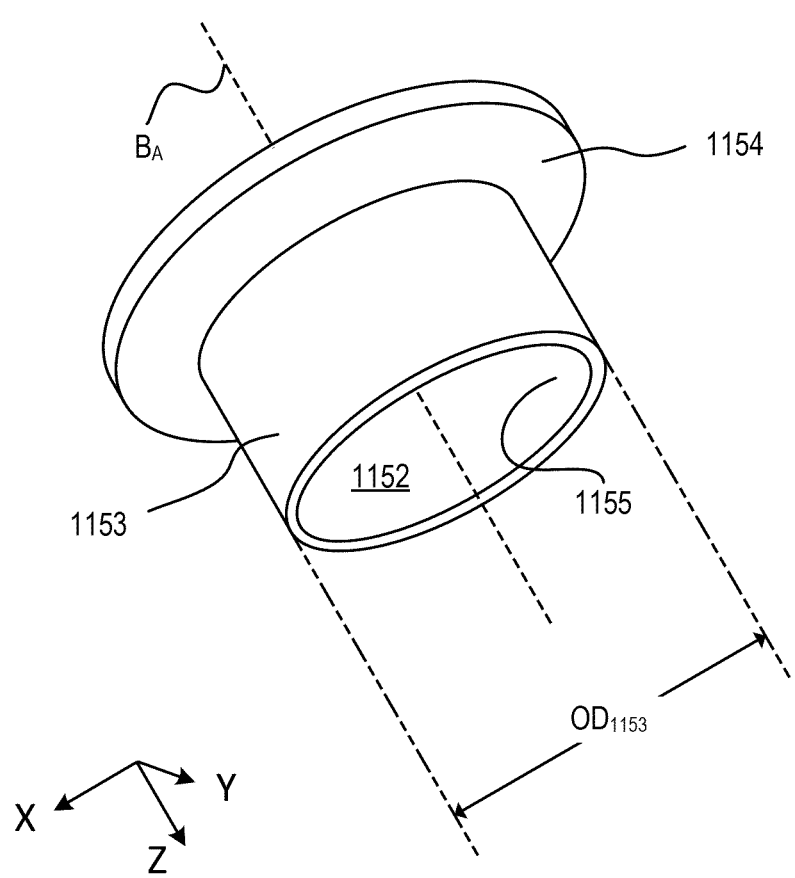
FIG. 11C is a perspective view of an implementation of the inner guard of the apparatus of FIG. 11A.

The inner guard 1153 extends through the opening 3300 of the second flange 330 along the axial direction $B_A$. With additional reference to FIG. 11C, the inner guard 1153 defines an inner guard passageway 1152 within the opening 3300. The inner guard 1153 is fixed to the second flange 330 by a mounting structure 1154. The inner guard 1153 is cylindrically shaped with a circular cross-section taken in the XY plane. The inner guard 1153 can have an inner surface 1155 (which defines the inner guard passageway 1152) that is generally smooth. The inner guard 1153 is made of a rigid material that is not reactive with fluid that passes through the bellows passageway 320. Thus, the inner guard 1153 can be made of a metal that includes a coating configured to prevent the particulates 328 from contaminating the inner guard 1153. For example, the coating can be metal nitride. If the particulates are formed from target material with a chamber of an EUV light source, then the inner guard 1153 coating can be selected so as to be compatible with and/or to repel the target material.

The distance between an outer diameter $OD_{1153}$ of the inner guard 1153 and the inner diameter of the second flange 330 is small enough to reduce an amount of the particulates 328 from contaminating the second flange 330. Specifically, the distance between an outer diameter $OD_{1153}$ of the inner guard 1153 and the inner diameter of the second flange 330 is configured to reduce the amount of particulates 328 from contaminating the second flange 330 at least in part because particles are repelled from the surfaces of the inner guard 1153 and the second flange 330. As described above, the particulates 328 can include solid particles and fluid particles. The inner guard 1153 coating is configured to repel the fluid particles to prevent the fluid particles from accumulating on the inner guard 1153 and prevent the solid particles from sticking to the inner guard 1153.

Figure 12:
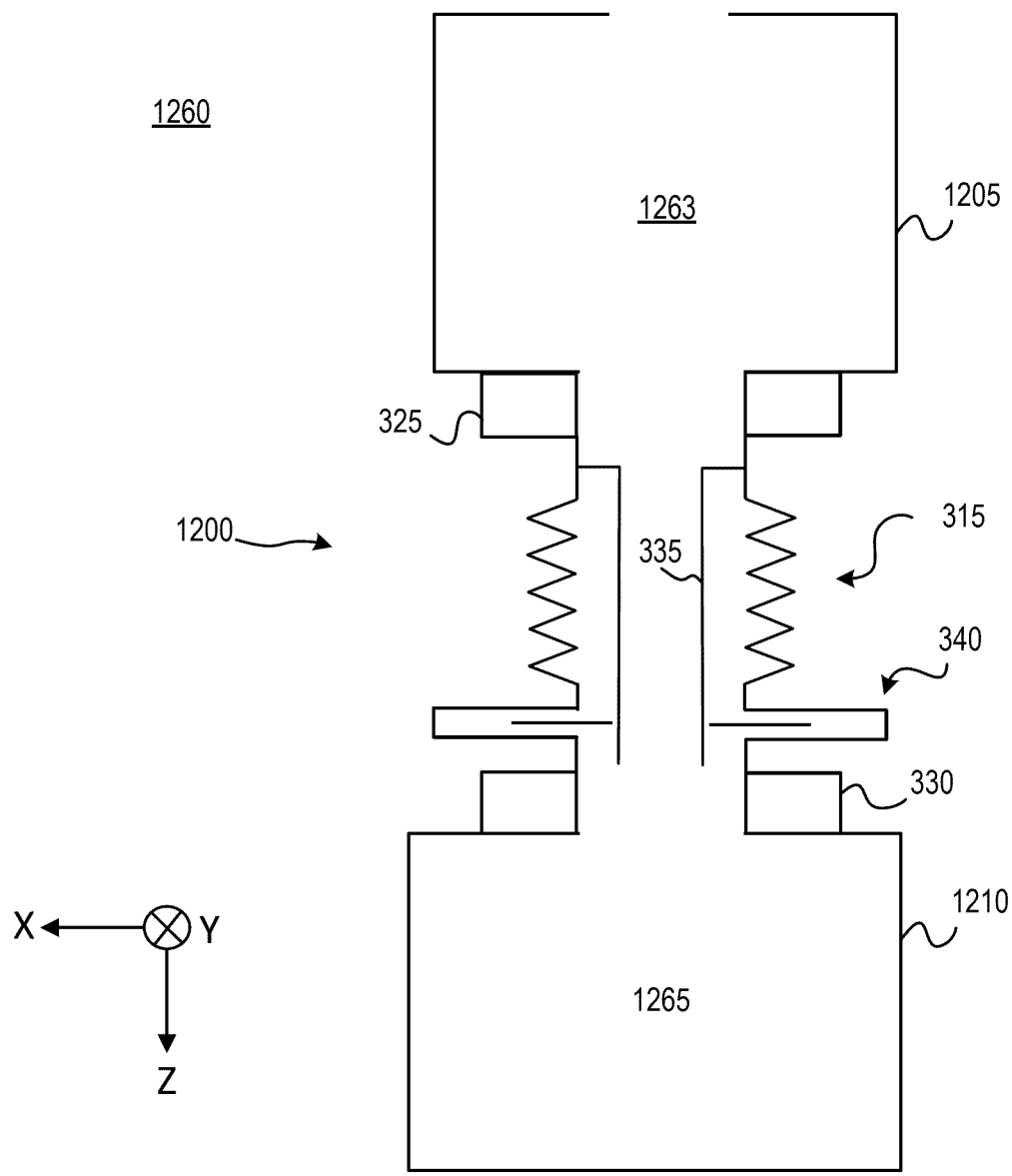
FIG. 12 is a block diagram of an apparatus including a structure, a receptacle, and the apparatus of FIG. 1 acting as a connection device between the structure and the receptacle.

Referring to FIG. 12, in some implementations, the apparatus 100 can be implemented as a connection device 1200 in an apparatus 1260. The apparatus 1260 includes, as the first part 105, a structure 1205 defining a structure interior 1263 configured to receive target material that travels along a path, and, as the second part 110, a receptacle 1210 defining a fluid volume 1265. The connection device 1200 is positioned between the structure 1205 and the receptacle 1210, and is configured to provide a fluid communication between the structure interior 1263 and the receptacle volume 1265. The first flange 325 is fixed to a wall of the structure 1205 and the second flange 330 is fixed to a wall of the receptacle 1210.

In some implementations, the receptacle 1210 is in fluid communication with a nozzle system of a target supply system configured to supply target material to an EUV light source, such as within a target material supply system 1375 of FIG. 13. In other implementations, the receptacle 1210 is a part of a target material debris collection and drain system of a drain module within a chamber of an EUV light source, such as a drain module 1364 shown in FIG. 13.

The apparatus 1260 (including the connection device 1200) can be implemented in an extreme ultraviolet (EUV) light source. Referring to FIG. 13, an EUV light source 1370 is shown. The EUV light source 1370 includes a chamber 1372 defining an interior 1373. The EUV light source 1370 includes a target material supply system 1375 including a droplet generator 1376 configured to produce a stream of targets 1377. The targets 1377 include a target material that emits EUV light when in a plasma state. The target material can be, for example, water, tin, lithium, xenon, or any material that, when converted to a plasma state, has an emission line in the EUV range. For example, the target material can be the element tin, which can be used as pure tin (Sn); as a tin compound, for example, SnBr4, SnBr2, SnH4; as a tin alloy, for example, tin-gallium alloys, tin-indium alloys, tin-indium-gallium alloys, or any combination of these alloys.

The targets 1377 are directed toward a target location 1378. One or more amplified light beams 1379 are also directed to the target location 1378. The interaction between an amplified light beam 1379 and the target material within the targets 1377 (at the target location 1378) produces plasma that emits EUV light or radiation 1380. A light collector 1382 collects and directs collected EUV light 1380 toward an optical apparatus 1384. The optical apparatus 1384 can be a lithography exposure apparatus, which uses this EUV light 1380 to create a pattern on a wafer, such as, using any number of process steps, which can be one or more of a combination of process steps such as etching, deposition, and lithography processes with a different mask to create a pattern of openings (such as grooves, channels, or holes) in the material of the wafer or in materials deposited on the wafer.

The apparatus 1260 is retained at a wall 1369 of the chamber 1372. The structure 1205 of the apparatus 1260 is designed as a structure 1305 having a structure passageway 1305p configured to receive targets 1377 (or the target material remaining from the targets 1377) that travel along a target material path Ptm. In this example, the structure 1305 is arranged at a location of the chamber 1372 that is opposite to the droplet generator 1376. Moreover, it is possible for the structure passageway 1305p and the target material path Ptm to coincide with a direction of gravity so that the apparatus 1260 acts as a gravity-driven drain configured to pass or trap the target material from the targets 1377, such target material traveling within the chamber 1372.

For example, the rigid inner sleeve 335 can have a cross-sectional shape other than a circle; such as polygonal or oval. As another example, another inner guard can be arranged relative to the first flange 325 (in addition to the inner guard 1153 arranged relative to the second flange 330). As a further example, it is possible to arrange the apparatus 1260 at a wall of the chamber 1372 such that the first flange 325 of the apparatus 1260 is fixed directly to the chamber wall and the second flange 330 is fixed to a wall of a second chamber (which can be the receptacle 1210).

Other aspects of the invention are set out in the following numbered clauses.

1. An apparatus comprising:
   a mechanically insulating device comprising a flexible bellows extending between first and second flanges, the flexible bellows defining a bellows passageway that extends along an axial direction between openings of the first and second flanges;
   a rigid inner sleeve affixed to or supported by the first flange and extending along the bellows passageway in the axial direction, the rigid inner sleeve having an outer diameter that is less than an inner diameter of the flexible bellows; and
   a shield device at least partly fixed to or supported by the second flange and defining an axial device opening having a diameter that is less than the inner diameter of the flexible bellows and is greater than the outer diameter of the rigid inner sleeve;
   wherein the shield device is configured to enable relative motion between the first and second flanges, the relative motion including translational motion along one or more directions that are perpendicular to the axial direction and rotational motion about one or more directions that are perpendicular to the axial direction.

2. The apparatus of clause 1, wherein the shield device extends into the bellows passageway.

3. The apparatus of clause 1, wherein a distance between an inner diameter of the flexible bellows and the outer diameter of the rigid inner sleeve is greater than about 10%, greater than about 20%, or greater than about 30%, of the inner diameter of the flexible bellows.

4. The apparatus of clause 1, wherein the shield device comprises one or more disks that extend along a direction that is not parallel to the axial direction.

5. The apparatus of clause 4, wherein the direction in which the one or more disks extend is perpendicular to the axial direction.

6. The apparatus of clause 4, wherein the one or more disks comprise a plurality of disks, and an outer diameter of at least one disk is different from the outer diameter of each other disk, and an inner diameter of at least one disk is different from the inner diameter of each other disk.

7. The apparatus of clause 4, wherein the one or more disks comprise a plurality of disks, and an outer diameter of at least one disk is equal to the outer diameter of another disk, and an inner diameter of at least one disk is equal to the inner diameter of another disk.

8. The apparatus of clause 4, wherein each disk is constrained from moving along the axial direction and is free to move along a direction not parallel to the axial direction.

9. The apparatus of clause 4, wherein each disk is defined by a thickness along the axial direction that allows each disk to be installed adjacent to the second flange.

10. The apparatus of clause 4, wherein each of the one or more disks comprises a slit that extends from an outer diameter of the disk to an inner diameter of the disk.

11. The apparatus of clause 4, wherein the shield device further comprises a disk housing configured to retain the one or more disks.

12. The apparatus of clause 11, wherein the disk housing is defined by an inner diameter that is equal to the inner diameter of the flexible bellows.

13. The apparatus of clause 11, wherein at least one disk of the one or more disks has an outer diameter that is greater than an inner diameter of the disk housing.

14. The apparatus of clause 11, wherein the one or more disks comprise a plurality of disks including a small disk that has an outer diameter that is less than a sum of an inner diameter of the disk housing plus an annular radius of the disk housing, the small disk sandwiched between two disks each having outer diameters that are greater than the sum of the inner diameter of the disk housing plus the annular radius of the disk housing.

15. The apparatus of clause 11, wherein each disk is defined by a thickness along the axial direction such that the one or more disks are receivable within the disk housing.

16. The apparatus of clause 1, wherein the shield device is configured to at least partially cover or cover a region between the flexible bellows and the rigid inner sleeve.

17. The apparatus of clause 16, wherein the particulates include one or more of solid particles, fluid particles, and splashes.

18. The apparatus of clause 1, wherein the flexible bellows comprises pleats configured to fold and unfold to enable the relative motion between the first and second flanges.

19. The apparatus of clause 1, wherein the shield device is made of a metal that includes a coating configured to prevent particulates from contaminating the shield device.

20. The apparatus of clause 19, wherein:
   the particulates include one or more of solid particles, fluid particles, and splashes; and
   the shield device coating is configured to: repel fluid particles to thereby prevent the fluid particles from accumulating on the shield device; and prevent solid particles solidified on the shield device from sticking to the shield device.

21. The apparatus of clause 20, wherein the shield device coating is further configured to prevent corrosion of an exterior surface of the shield device, such corrosion being caused by contamination by the particulates.

22. The apparatus of clause 19, wherein the metal is stainless steel and the shield device coating is a metal nitride or a metal oxide.

23. The apparatus of clause 1, wherein the rigid inner sleeve is made of a metal.

24. The apparatus of clause 23, wherein the metal has a high thermal conductivity.

25. The apparatus of clause 1, wherein the rigid inner sleeve is made of molybdenum, aluminum, copper, aluminum oxide, diamond, or graphite.

26. The apparatus of clause 23, wherein the rigid inner sleeve includes a coating configured to prevent particulates from contaminating one or more of the shield device and the rigid inner sleeve.

27. The apparatus of clause 26, wherein:
the particulates include one or more of: solid particles, fluid particles, and splashes; and the rigid inner sleeve coating is configured to: repel the fluid particles to thereby prevent the fluid particles from accumulating on the shield device; and prevent solid particles solidified on the shield device from sticking to the shield device.

28. The apparatus of clause 27, wherein the rigid inner sleeve coating is configured to repel fluid particles along a direction that is parallel to the axial direction or away from the shield device such that when a fluid propagates through the rigid inner sleeve such fluid detaches from the rigid inner sleeve having a propagation direction that is parallel to the axial direction or away from the shield device.

29. The apparatus of clause 27, wherein the rigid inner sleeve coating is further configured to prevent corrosion of an exterior surface of the shield device, such corrosion caused by contamination of the particulates.

30. The apparatus of clause 1, wherein the rigid inner sleeve includes a coating of a metal nitride, a metal oxide, or a silicon nitride.

31. The apparatus of clause 1, further comprising a heating apparatus configured to adjust a temperature of the rigid inner sleeve.

32. The apparatus of clause 31, wherein the heating apparatus is in direct thermal communication with an outer surface of the rigid inner sleeve to adjust the temperature of the rigid inner sleeve by thermal conduction and the heating apparatus is not in direct thermal communication with the flexible bellows.

33. The apparatus of clause 1, wherein the first and second flanges are vacuum flanges.

34. The apparatus of clause 1, further comprising an inner guard extending over an opening of one or more of: the first flange and the second flange.

35. The apparatus of clause 34, wherein the inner guard is made of a metal that includes a guard coating configured to prevent particulates from contaminating the inner guard.

36. The apparatus of clause 35, wherein the distance between the inner guard and the respective flange is small enough to reduce an amount of particulates from contaminating the respective flange.

37. The apparatus of clause 36, wherein the distance between the inner guard and the respective flange is configured to reduce the amount of particulates from contaminating the respective flange at least in part because particles are repelled from the surfaces of the inner guard and the respective flange.

38. The apparatus of clause 36, wherein the particulates include solid particles and fluid particles, and the coating is configured to: repel the fluid particles to prevent the fluid particles from accumulating on the inner guard; and prevent the solid particles from sticking to the inner guard.

39. The apparatus of clause 35, wherein the guard coating is a metal nitride.

40. The apparatus of clause 1, wherein the rigid inner sleeve and the shield device are arranged so that the rigid inner sleeve is configured to penetrate the opening of the shield device.

41. The apparatus of clause 1, wherein the flexible bellows is coupled or fixed at a first end to the first flange and at a second end to the second flange.

42. The apparatus of clause 1, wherein the rigid inner sleeve is either affixed directly to the first flange or is affixed to a first end of the flexible bellows that is fixed to the first flange.

43. An extreme ultraviolet (EUV) light source comprising:
a chamber comprising a chamber wall defining a fluid portal; and
an apparatus retained at the chamber wall, the apparatus comprising:
a mechanically insulating device comprising a flexible bellows extending between first and second flanges, the flexible bellows defining a bellows passageway that extends along an axial direction between openings of the first and second flanges that are in fluid communication with the fluid portal;
a rigid inner sleeve being affixed to or supported by the first flange and extending along the bellows passageway in the axial direction, the rigid inner sleeve having an outer diameter that is less than an inner diameter of the flexible bellows; and
a shield device at least partly fixed to or supported by the second flange and defining an axial device opening having a diameter that is less than the inner diameter of the flexible bellows and is greater than the outer diameter of the rigid inner sleeve;
wherein the shield device is configured to enable relative motion between the first and second flanges caused by movement of the chamber wall, the relative motion including translational motion along one or more directions that are perpendicular to the axial direction and rotational motion about one or more directions that are perpendicular to the axial direction.

44. The EUV light source of clause 43, wherein the first flange is fixed to the chamber wall and the second flange is fixed to a second wall of a second chamber.

45. The EUV light source of clause 43, further comprising a target material supply system comprising a droplet generator configured to produce a stream of targets, wherein the targets comprise a target material that emits EUV light when in a plasma state.

46. The EUV light source of clause 45, further comprising a structure comprising a structure passageway configured to receive target material that travels along a target material path, wherein the first flange is fixed to a wall of the structure.

47. The EUV light source of clause 46, wherein the second flange is fixed to a wall of a receptacle configured to receive target material from the structure passageway.

48. The EUV light source of clause 47, wherein the first and second flanges are vacuum flanges, the first flange is fixed to the wall of the structure with a vacuum seal, and the second flange is fixed to the wall of the receptacle with another vacuum seal.

49. The EUV light source of clause 48, further comprising a first inner guard extending over the opening of the first flange, and a second inner guard extending over the opening of the second flange, wherein each of the first and second inner guards is configured to: block the target material from contacting the respective vacuum seal; and prevent the target material from solidifying between the respective flange and the structure wall at the location of the vacuum seal and forming an unwanted joint between the respective flange and the structure wall.

50. The EUV light source of clause 46, wherein the structure is arranged at a location of the chamber opposite to the droplet generator.

51. The EUV light source of clause 46, wherein the structure passageway coincides with a direction of gravity and a flow direction of the target material at least partly coincides with the direction of gravity.

52. The EUV light source of clause 44, wherein the apparatus is implemented as a gravity-driven drain configured to pass or trap target material traveling within the chamber.

53. An apparatus comprising:
a mechanically insulating device comprising a flexible bellows extending between first and second flanges, the flexible bellows defining a bellows passageway that extends along an axial direction between openings of the first and second flanges;
a rigid inner sleeve being affixed to or supported by the first flange and extending along the bellows passageway in the axial direction, the rigid inner sleeve having an outer diameter that is less than an inner diameter of the flexible bellows; and
a shield device at least partly fixed to or supported by the second flange and defining an axial device opening having a diameter that is less than the inner diameter of the flexible bellows and is greater than the outer diameter of the rigid inner sleeve, wherein the shield device is configured to at least partly cover or cover a region between the flexible bellows and the rigid inner sleeve.

54. The apparatus of clause 53, wherein the shield device comprises one or more movable disks supported by a disk housing fixed to the second flange, each disk defining an opening large enough to accommodate the rigid inner sleeve, wherein each disk has an inner diameter that is less than the inner diameter of the flexible bellows.

55. The apparatus of clause 54, wherein the one or more movable disks are configured to enable relative motion between the first and second flanges, the relative motion including translational motion along one or more directions that are perpendicular to the axial direction and rotational motion about one or more directions that are perpendicular to the axial direction.

56. An apparatus comprising:
a structure comprising a structure interior configured to receive target material that travels along a path;
a receptacle including a volume; and
a connection device between the structure and the receptacle, and configured to provide fluid communication between the structure interior and the receptacle volume, the connection device comprising:
a mechanically insulating device comprising a flexible bellows extending between first and second flanges, the flexible bellows defining a bellows passageway that extends along an axial direction between openings of the first and second flanges, the first flange fixed to a wall of the structure and the second flange fixed to the receptacle;
an inner sleeve affixed to or supported by the first flange and extending within the bellows passageway in the axial direction, the inner sleeve having an outer diameter that is less than an inner diameter of the flexible bellows and defining a sleeve passageway within the bellows passageway, such that the sleeve passageway provides the fluid communication between the structure interior and the receptacle volume; and
a shield device at least partly fixed to or supported by the second flange and defining an axial device opening having a diameter that is less than the inner diameter of the flexible bellows and is greater than the outer diameter of the inner sleeve.

57. The apparatus of clause 56, wherein the receptacle is in fluid communication with a nozzle system of a target supply system configured to supply target material to an EUV light source.

58. The apparatus of clause 56, wherein the receptacle is a part of a target material debris collection and drain system of a drain module within a chamber of an EUV light source.

Other implementations are within the scope of the following claims.

The invention claimed is:

1. An apparatus comprising:
a mechanically insulating device comprising a flexible bellows extending between first and second flanges, the flexible bellows defining a bellows passageway that extends along an axial direction between openings of the first and second flanges;
a rigid inner sleeve affixed to or supported by the first flange and extending along the bellows passageway in the axial direction, the rigid inner sleeve having an outer diameter that is less than an inner diameter of the flexible bellows; and
a shield device at least partly fixed to or supported by the second flange and defining an axial device opening having a diameter that is less than the inner diameter of the flexible bellows and is greater than the outer diameter of the rigid inner sleeve;
wherein the shield device comprises one or more disks and a disk housing defining an interior cavity configured to retain the one or more disks and constrain the one or more disks along the axial direction.

2. The apparatus of claim 1, wherein the shield device extends into the bellows passageway.

3. The apparatus of claim 1, wherein the one or more disks extend along a direction that is not parallel to the axial direction.

4. The apparatus of claim 1, wherein the one or more disks comprise a plurality of disks, an outer diameter of at least one disk is different from the outer diameter of each other disk, and an inner diameter of at least one disk is different from the inner diameter of each other disk.

5. The apparatus of claim 1, wherein the disk housing has an annular shape.

6. The apparatus of claim 1, wherein the shield device is made of a metal that includes a coating configured to prevent particulates from contaminating the shield device.

7. The apparatus of claim 6, wherein the metal is stainless steel and the shield device coating is a metal nitride or a metal oxide.

8. The apparatus of claim 1, wherein the rigid inner sleeve is made of molybdenum, aluminum, copper, aluminum oxide, diamond, or graphite.

9. The apparatus of claim 1, wherein the rigid inner sleeve includes a coating of a metal nitride, a metal oxide, or a silicon nitride.

10. The apparatus of claim 1, further comprising a heating apparatus configured to adjust a temperature of the rigid inner sleeve.

11. The apparatus of claim 1, further comprising an inner guard extending over an opening of one or more of: the first flange and the second flange.

12. The apparatus of claim 11, wherein the inner guard is made of a metal that includes a guard coating configured to prevent particulates from contaminating the inner guard.

13. The apparatus of claim 1, wherein the rigid inner sleeve and the shield device are arranged so that the rigid inner sleeve is configured to penetrate the opening of the shield device.

14. The apparatus of claim 1, wherein the shield device is configured to enable relative motion between the first and second flanges, the relative motion including translational motion along one or more directions that are perpendicular to the axial direction and rotational motion about one or more directions that are perpendicular to the axial direction.

15. The apparatus of claim 1, wherein the interior cavity of the disk housing extends annularly outward beyond the axial device opening.

16. An apparatus comprising:
a mechanically insulating device comprising a flexible bellows extending between first and second flanges, the flexible bellows defining a bellows passageway that extends along an axial direction between openings of the first and second flanges;
a rigid inner sleeve affixed to or supported by the first flange and extending along the bellows passageway in the axial direction, the rigid inner sleeve having an outer diameter that is less than an inner diameter of the flexible bellows; and
a shield device at least partly fixed to or supported by the second flange and defining an axial device opening having a diameter that is less than the inner diameter of the flexible bellows and is greater than the outer diameter of the rigid inner sleeve, the shield device comprising one or more disks that extend along a direction that is not parallel to the axial direction, wherein at least one disk of the one or more disks has an outer diameter that is greater than an inner diameter of the disk housing.

17. An apparatus comprising:
a mechanically insulating device comprising a flexible bellows extending between first and second flanges, the flexible bellows defining a bellows passageway that extends along an axial direction between openings of the first and second flanges;
a rigid inner sleeve affixed to or supported by the first flange and extending along the bellows passageway in the axial direction, the rigid inner sleeve having an outer diameter that is less than an inner diameter of the flexible bellows; and
a shield device at least partly fixed to or supported by the second flange and defining an axial device opening having a diameter that is less than the inner diameter of the flexible bellows and is greater than the outer diameter of the rigid inner sleeve, the shield device comprising one or more disks that extend along a direction that is not parallel to the axial direction,
wherein the one or more disks comprise a plurality of disks including a small disk that has an outer diameter that is less than a sum of an inner diameter of the disk housing plus an annular radius of the disk housing, the small disk sandwiched between two disks each having outer diameters that are greater than the sum of the inner diameter of the disk housing plus the annular radius of the disk housing.

18. An extreme ultraviolet (EUV) light source comprising:
a chamber comprising a chamber wall defining a fluid portal; and
an apparatus retained at the chamber wall, the apparatus comprising:
a mechanically insulating device comprising a flexible bellows extending between first and second flanges, the flexible bellows defining a bellows passageway that extends along an axial direction between openings of the first and second flanges that are in fluid communication with the fluid portal;
a rigid inner sleeve being affixed to or supported by the first flange and extending along the bellows passageway in the axial direction, the rigid inner sleeve having an outer diameter that is less than an inner diameter of the flexible bellows; and
a shield device at least partly fixed to or supported by the second flange and defining an axial device opening having a diameter that is less than the inner diameter of the flexible bellows and is greater than the outer diameter of the rigid inner sleeve;
wherein the shield device comprises one or more disks and a disk housing defining an interior cavity configured to retain the one or more disks and constrain the one or more disks along the axial direction.

19. The EUV light source of claim 18, further comprising a target material supply system comprising a droplet generator configured to produce a stream of targets, wherein the targets comprise a target material that emits EUV light when in a plasma state.

20. The EUV light source of claim 19, further comprising a structure comprising a structure passageway configured to receive the target material that travels along a target material path, wherein the first flange is fixed to a wall of the structure.

21. An apparatus comprising:
a structure comprising a structure interior configured to receive target material that travels along a path;
a receptacle including a volume; and
a connection device between the structure and the receptacle, and configured to provide fluid communication between the structure interior and the receptacle volume, the connection device comprising:
a mechanically insulating device comprising a flexible bellows extending between first and second flanges, the flexible bellows defining a bellows passageway that extends along an axial direction between openings of the first and second flanges, the first flange fixed to a wall of the structure and the second flange fixed to the receptacle;
an inner sleeve affixed to or supported by the first flange and extending within the bellows passageway in the axial direction, the inner sleeve having an outer diameter that is less than an inner diameter of the flexible bellows and defining a sleeve passageway within the bellows passageway, such that the sleeve passageway provides the fluid communication between the structure interior and the receptacle volume; and
a shield device at least partly fixed to or supported by the second flange and defining an axial device opening having a diameter that is less than the inner diameter of the flexible bellows and is greater than the outer diameter of the inner sleeve, wherein:

the shield device comprises one or more disks that extend along a direction that is not parallel to the axial direction;

the shield device further comprises a disk housing configured to retain one or more disks; and an outer diameter of the one or more disks is greater than an inner diameter of the disk housing.

22. The apparatus of claim 21, wherein the receptacle is in fluid communication with a nozzle system of a target supply system configured to supply target material to an EUV light source.

23. An apparatus comprising:

a mechanically insulating device comprising a flexible bellows extending between first and second flanges, the flexible bellows defining a bellows passageway that extends along an axial direction between openings of the first and second flanges;

a rigid inner sleeve affixed to or supported by the first flange and extending along the bellows passageway in the axial direction, the rigid inner sleeve having an outer diameter that is less than an inner diameter of the flexible bellows; and a shield device at least partly fixed to or supported by the second flange and defining an axial device opening having a diameter that is less than the inner diameter of the flexible bellows and is greater than the outer diameter of the rigid inner sleeve, the shield device comprising one or more disks that extend along a direction that is not parallel with the axial direction, an outer diameter of the one or more disks being greater than an inner diameter of the flexible bellows.

24. The apparatus of claim 23, wherein the one or more disks comprise a plurality of disks including a small disk that has an outer diameter that is less than a sum of an inner diameter of the disk housing plus an annular radius of the disk housing, the small disk sandwiched between two disks each having outer diameters that are greater than the sum of the inner diameter of the disk housing plus the annular radius of the disk housing.

25. The apparatus of claim 23, wherein the one or more disks comprise a plurality of disks, an outer diameter of at least one disk is different from the outer diameter of each other disk, and an inner diameter of at least one disk is different from the inner diameter of each other disk.

26. The apparatus of claim 23, wherein the shield device further comprises a disk housing configured to constrain the one or more disks along the axial direction.

27. The apparatus of claim 26, wherein each disk is defined by a thickness along the axial direction such that the one or more disks are receivable within the disk housing.

28. The apparatus of claim 23, wherein the shield device is configured to enable relative motion between the first and second flanges, the relative motion including translational motion along one or more directions that are perpendicular to the axial direction and rotational motion about one or more directions that are perpendicular to the axial direction.

29. The apparatus of claim 23, wherein a distance between an inner diameter of the flexible bellows and the outer diameter of the rigid inner sleeve is greater than about 10%, greater than about 20%, or greater than about 30% of the inner diameter of the flexible bellows.

30. The apparatus of claim 23, wherein the direction in which the one or more disks extend is perpendicular to the axial direction.

31. The apparatus of claim 23, wherein each disk has an annular shape that defines a central opening through which the rigid sleeve passes.

* * * * *